(12) United States Patent
Sato et al.

(10) Patent No.: US 7,894,223 B2
(45) Date of Patent: Feb. 22, 2011

(54) SWITCHING POWER SUPPLY CIRCUIT

(75) Inventors: Hideo Sato, Fukushima (JP); Takahiro Kobayashi, Fukushima (JP); Hiroaki Takahashi, Fukushima (JP)

(73) Assignee: Oki Power Tech Co., Ltd., Fukushima (JP)

( * ) Notice: Subject to any disclaimer, the term of this patent is extended or adjusted under 35 U.S.C. 154(b) by 750 days.

(21) Appl. No.: 11/909,259

(22) PCT Filed: Mar. 22, 2006

(86) PCT No.: PCT/JP2006/305723

§ 371 (c)(1),
(2), (4) Date: Sep. 20, 2007

(87) PCT Pub. No.: WO2006/101135

PCT Pub. Date: Sep. 28, 2006

(65) Prior Publication Data

US 2009/0015228 A1 Jan. 15, 2009

(30) Foreign Application Priority Data

Mar. 22, 2005 (JP) ............................. 2005-081263
Nov. 17, 2005 (JP) ............................. 2005-333417

(51) Int. Cl.
*H02M 3/24* (2006.01)
*G05F 1/40* (2006.01)
(52) U.S. Cl. ...................... 363/97; 363/21.01; 323/285
(58) Field of Classification Search ... 363/21.01–21.18, 363/56.1, 97; 323/222, 282–285
See application file for complete search history.

(56) References Cited

U.S. PATENT DOCUMENTS 4,278,940 A * 7/1981 Milkovic ..................... 324/127

(Continued)

FOREIGN PATENT DOCUMENTS

CN 87 1 00412 5/1988

(Continued)

OTHER PUBLICATIONS

Chinese Office Action dated Mar. 6, 2009 with English translation.

(Continued)

*Primary Examiner*—Jessica Han
(74) *Attorney, Agent, or Firm*—Dickinson Wright PLLC

(57) ABSTRACT

A switching power supply circuit uses a magnetic material that is harder to be magnetically saturated than ferrite as a core of a transformer or a choke coil and suitably protects a switching element. The circuit includes a transformer having a core made of a magnetic material of amorphous metal, a primary-side winding and a secondary-side winding. The circuit further includes a switching element for flowing current through the primary-side winding of the transformer according to a pulsive drive signal, and a primary-side current detection circuit for detecting the current flowing through the primary-side winding. The circuit further includes plural circuit elements for rectifying and smoothing a voltage generated in the secondary-side winding of the transformer to generate an output voltage, and a control circuit for generating the drive signal based on at least a detection result of the primary-side current detection circuit, and limiting a period for flowing the current in the primary-side winding.

14 Claims, 22 Drawing Sheets

U.S. PATENT DOCUMENTS

| | | | |
|---|---|---|---|
| 4,649,465 A | | 3/1987 | Kitou et al. |
| 4,704,670 A | * | 11/1987 | Gradl et al. ............... 363/21.16 |
| 5,612,610 A | * | 3/1997 | Borghi et al. ............... 323/222 |
| 6,707,283 B1 | * | 3/2004 | Ball ........................... 323/284 |
| 7,466,110 B2 | * | 12/2008 | Tsuruya ...................... 323/207 |
| 7,746,673 B2 | * | 6/2010 | Grant et al. ............... 363/21.18 |
| 2002/0015316 A1 | | 2/2002 | Nakazawa et al. |
| 2004/0032754 A1 | * | 2/2004 | Yang ....................... 363/56.09 |

FOREIGN PATENT DOCUMENTS

| | | |
|---|---|---|
| JP | 61-33077 | 2/1986 |
| JP | 6-311734 | 11/1994 |
| JP | 8-234852 | 9/1996 |
| JP | 11-178347 | 7/1999 |
| JP | 2002-51550 | 2/2002 |
| JP | 2002-354790 | 12/2002 |
| JP | 2003284330 | 3/2003 |
| JP | 2004320917 | 11/2004 |
| JP | 3-642398 | 4/2005 |

OTHER PUBLICATIONS

Korean Office Action dated Sep. 1, 2009 with partial English translation thereof.

Monthly Electronic Parts, "Current Mode Control Type Flyback Convertor and Forward Convertor," EP&C, Nov. 2000, pp. 106-118, with partial translation of p. 106.

Unitrode UC3842 Data Sheet "Current Mode PWM Controller" Texas Instruments Inc., 1999, pp. 1-8.

M. Telefus, et al., "Pulse Train™, a Novel Digital Control Method, Applied to a Discontinuous Conduction Mode Flyback Convertor," IEEE 34$^{th}$ Annual Power Electronics Specialist Conference, Jun. 2003, vol. 3, pp. 1141-1146.

Jingquan Chen, et al., "Predictive Digital Current Programmed Control," IEEE Transactions on Power Electronics, Jan. 2003, vol. 18, No. 1, pp. 411-419.

International Search Report dated Jun. 27, 2006.

* cited by examiner

SWITCHING POWER SUPPLY CIRCUIT

TECHNICAL FIELD

The present invention relates to a switching power supply circuit to be generally used in electronic equipment, and specifically, to a switching power supply circuit for converting a commercial power supply voltage into a desired direct-current voltage by using a transformer or a choke coil.

BACKGROUND ART

Recent years, with the reduction in size and weight of electronic equipment, the switching power supplies, that are smaller and lighter and can efficiently output power, have been widely used. In a switching power supply, when electric insulation is necessary between the input side and the output side, a transformer is used. As a switching power supply using a transformer, a flyback switching power supply, with which a high power output voltage can be obtained, is known.

In the flyback switching power supply, a primary-side winding of the transformer and a switching element are series-connected, and a direct-current voltage obtained by rectifying and smoothing an alternating-current voltage of the commercial power supply voltage is applied to the series circuit of them, and current flows through the primary-side winding of the transformer when the switching element is turned on and off. When the switching element is turned on, the current flowing through the primary-side winding of the transformer accumulates energy in a core of the transformer, and when the switching element is turned off, the accumulated energy is released from the secondary side winding of the transfer such that the output current is charged in a capacitor via a diode, and thereby, a direct-current output voltage is generated.

Thus, in the flyback switching power supply, the operation changes according to switching between on and off of the switching element, and the output voltage can be controlled by varying the ratio of on-period and off-period. Further, the output voltage also changes depending on the turn ratio or characteristics of the transformer.

On the other hand, when the electric insulation is not necessary between the input side and the output side, a chopper type switching power supply using a choke coil in place of a transformer is used. Generally, as a magnetic material for a core of the transformer or the choke coil, ferrite having low loss and high efficiency is used. However, since ferrite is apt to be magnetically saturated, when the current of a winding wound around a core exceeds a certain value, the core is saturated and the magnetic characteristic becomes lower. In order to avoid this, it is necessary to form a gap in the core, but a problem of leakage of magnetic flux arises in this case.

As a related technology, Japanese Patent Application Publication JP-P2004-320917A discloses a switching power supply device that prevents failure of circuit elements due to overcurrent of power supply output with a circuit having a simple configuration, and contributes to downsizing and cost reduction of the device. The switching power supply device includes a current detection circuit for detecting a current flowing in a main switch element and outputting the detection result to a current detection terminal of a control IC, and the control IC has a pulse-by-pulse overcurrent protection circuit for turning off the main switch element when the current flowing through the main switch element exceeds a predetermined threshold value.

Furthermore, the switching power supply device includes a power supply output detection circuit for detecting the output voltage of the power supply, and a switching frequency setting circuit for setting a switching frequency of the main switch element. When the output voltage of the power supply becomes lower than a preset value, a part of the current flowing in the switching frequency setting circuit is bypassed to the current detection circuit and superimposed to the current therein, and the control IC detects the superposed current at the current detection terminal and operates to suppress the current flowing through the main switch element. At the same time, the switching power supply device reduces the switching frequency provided by the switching frequency setting circuit to perform over current protection operation of the power supply output.

JP-P2004-320917A discloses that downsizing of components such as a rectifying element and transformer can be realized, but does not disclose that magnetic materials other than ferrite may be used as a core of the transformer.

Further, Japanese Patent Publication JP-P3642398 (JP-P2001-75659A) discloses that, in a power supply control method of controlling the output of the power supply, the maximum rated output that permits the overload condition exceeding the rated output in a permitted time is variably set according to a temperature.

Furthermore, Japanese Patent Application Publication JP-P2003-284330A discloses a control device that controls a direct-current converter with reference to the size of a switching element in an actual use situation. The control device includes detecting means for detecting an input voltage to the direct-current converter, determining means for determining the maximum rated current that indicates the maximum value of the operating current of the direct-current converter according to the voltage level of the detected input voltage so as to suppress the current when the input voltage becomes lower, and suppressing means for suppressing output current when the output current of the direct-current converter exceeds the maximum rated current.

However, JP-P3642398 or JP-P2003-284330A does not disclose that magnetic materials other than ferrite may be used as a core of the transformer.

DISCLOSURE OF THE INVENTION

Accordingly, in view of the above-mentioned points, an object of the present invention is to provide a switching power supply circuit having improved power supply performance to a dynamic load, in which the power consumption instantaneously increases, as a printer by using a magnetic material that is harder to be saturated than ferrite as a core of a transformer or a choke coil and appropriately protecting a switching element.

In order to achieve the above-mentioned object, a switching power supply circuit according to a first aspect of the present invention includes: a transformer having a core comprising a magnetic material of amorphous metal and a primary-side winding and a secondary-side winding wound around the core; a switching element series-connected to the primary-side winding of the transformer, for flowing current through the primary-side winding of the transformer according to a pulsive drive signal; a primary-side current detection circuit for detecting the current flowing through the primary-side winding of the transformer; plural circuit elements for rectifying and smoothing a voltage generated in the secondary-side winding of the transformer to generate an output voltage; and a control circuit for generating the drive signal based on at least a detection result of the primary-side current detection circuit, and limiting a period for flowing the current in the primary-side winding of the transformer.

Further, a switching power supply circuit according to a second aspect of the present invention includes: a choke coil having a core comprising a magnetic material of amorphous metal and a winding wound around the core; a switching element connected to one terminal of the choke coil, for flowing current through the choke coil according to a pulsive drive signal; a switching current detection circuit for detecting the current of the switching element; plural circuit elements for rectifying and smoothing a voltage generated in a connection point between the choke coil and the switching element to generate an output voltage; and a control circuit for generating the drive signal based on at least a detection result of the switching current detection circuit, and limiting a period for flowing the current in the winding of the choke coil.

According to the present invention, in the switching power supply circuit, the saturating characteristic is improved by using the transformer or the choke coil having the core comprising the magnetic material of amorphous metal, and the suitable control operation is performed for protecting the switching element. Thus, the power supply performance to a dynamic load, in which the power consumption instantaneously increases, as a printer can be improved.

BEST MODE FOR CARRYING OUT THE INVENTION

Figure 1:
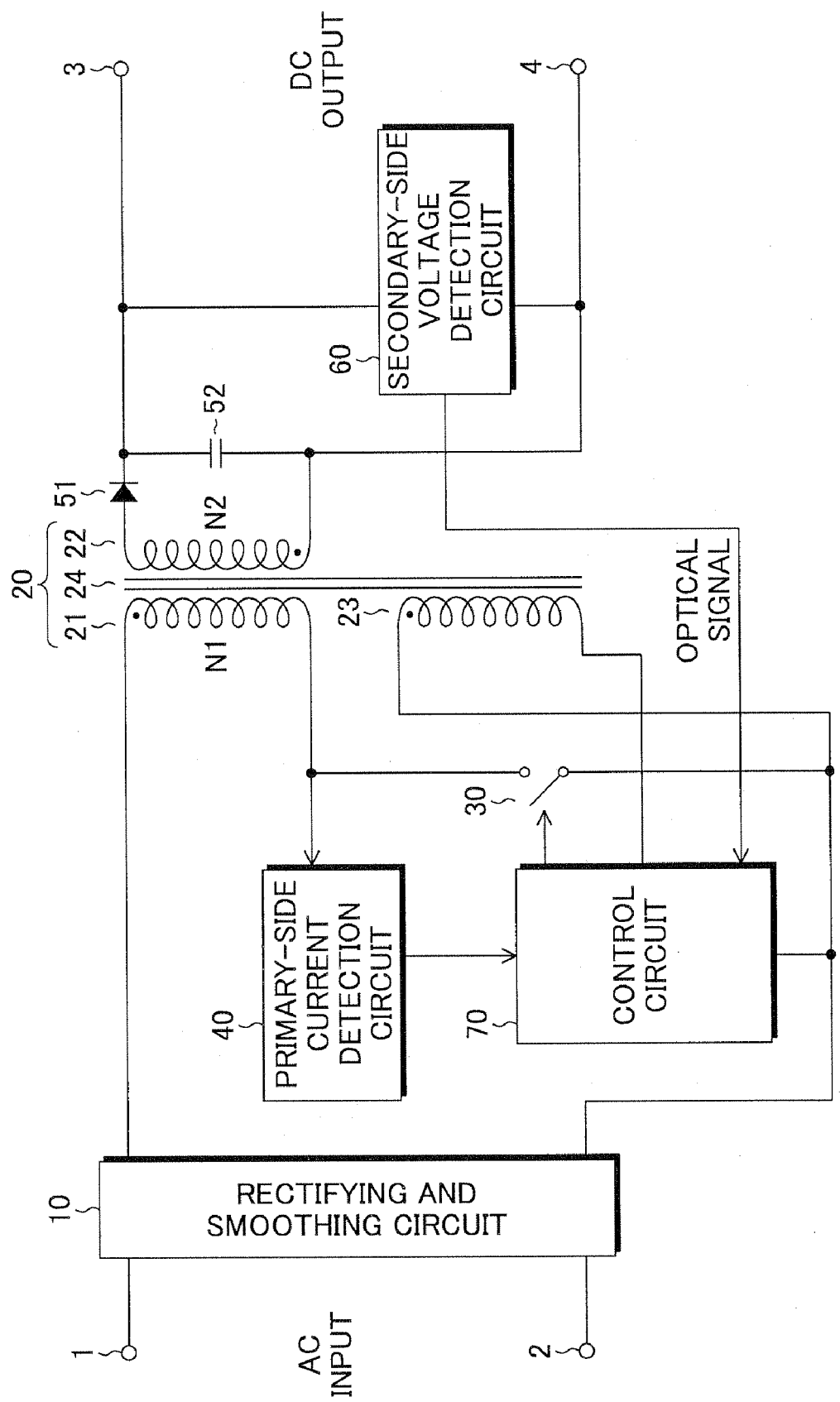
FIG. 1 shows a configuration of a switching power supply circuit according to the first embodiment of the present invention.

Hereinafter, some embodiments of the present invention will be explained in detail by referring to the drawings. The same reference numerals are assigned to the same component elements and the description thereof will be omitted.

FIG. 1 shows a configuration of a switching power supply circuit according to the first embodiment of the present invention. This switching power supply circuit has a rectifying and smoothing circuit 10 connected to input terminals 1 and 2 for an alternating-current power supply voltage, a transformer 20 for stepping up or stepping down the alternating-current voltage at the primary side and outputting it to the secondary side, a switching element 30 series-connected to a primary-side winding 21 of the transformer, for flowing current through the primary-side winding 21 of the transformer according to a pulsive drive signal, and a primary-side current detection circuit 40 for detecting the current flowing through the primary-side winding 21 of the transformer.

Further, the switching power supply circuit has a diode 51 for half-wave rectifying a voltage generated in a secondary-side winding 22 of the transformer, a capacitor 52 for smoothing the rectified voltage, a secondary-side voltage detection circuit 60 for detecting the smoothed voltage at both terminals of the capacitor 52, and a control circuit 70 for generating the drive signal based on a detection result of the primary-side current detection circuit 40 and a detection result of the secondary-side voltage detection circuit 60, and limiting the period for flowing the current in the primary-side winding 21 of the transformer. In a part of the feedback signal path from the secondary-side voltage detection circuit 60 to the control circuit 70, an optical signal transmitting element such as a photocoupler is used.

The rectifying and smoothing circuit 10 includes a diode bridge and a capacitor, for example, and full-wave rectifies the alternating-current voltage applied between the input terminal 1 and the input terminal 2 with the diode bridge and smoothes the voltage with the capacitor.

The transformer 20 has a core 24 of a magnetic material, the primary-side winding 21, the secondary-side winding 22, and an auxiliary winding 23 wound around the core 24. Given that the number of turns of the primary-side winding 21 is N1, the number of turns of the secondary-side winding 22 is N2 and there is no loss, the step-up ratio between the primary side and the secondary side is N2/N1. Further, the auxiliary winding 23 is used for supplying the power supply voltage to the control circuit 70. The dot marks in the transformer 20 indicate the polarities of the windings.

Generally, in the switching power supply, as a power transmission system from the primary side to the secondary side of the transformer, there are two systems such as a forward system of transmitting power from the primary side to the secondary side when the switching is turned on and a flyback system of transmitting power from the primary side to the secondary side when the switching is turned off. In the embodiment, the flyback system with which many high-voltage outputs can be drawn at the secondary side is adopted.

In the flyback switching power supply as shown in FIG. 1, the primary-side winding 21 and the secondary-side winding 22 of the transformer have reverse polarities to each other. While the switching element is turned on, the primary-side current of the transformer 20 increases but no secondary-side current flows because the secondary side of the transformer 20 is inversely biased by the diode. The transformer 20 accumulates energy in the core 24 when the switching element is turned on.

Then, when the switching element is turned off, the magnetic field tends to maintain the current, and thus, the voltage polarity of the transformer 20 is reversed and current flows at the secondary side of the transformer 20. The secondary-side current of the transformer 20 is charged in the capacitor 52 via the diode 51 series-connected to the secondary-side winding 22 of the transformer to generate a direct-current output voltage between an output terminal 3 and an output terminal 4.

In the present invention, a magnetic material of amorphous metal having high saturation magnetic flux density is used for the core 24 of the transformer. As a specific material, for example, an amorphous alloy Fe—Co (60-80 wt %) containing iron (Fe) and cobalt (Co) may be used. As a type of core, a bulk type molded by sintering a powder material and a laminate type formed by stacking ribbon-shaped cores may be used.

The magnetic material of amorphous metal has advantages that its saturation magnetic flux density is higher than that of ferrite, molding is easier when an E-shaped core is molded, its magnetic characteristic varies less depending on the temperature, its hysteresis loss and eddy current loss is smaller and its high-frequency characteristic is better. Further, when the magnetic material of amorphous metal is used for the core of the transformer, the core is hard to be magnetically saturated and the amount of heat generation is small, and thus, the power twice or more the power in the case of using ferrite can be supplied. Since there is no need to form a gap in the core, the leakage of magnetic flux from the gap is not problematic.

Note that, when the magnetic material of amorphous metal is used, inductance per number of turns (also referred to as "AL value") is smaller than that in the case of using ferrite. Accordingly, the inductance of the winding is smaller even if the number of turns is increased to some degree and the current flowing in the winding increases. Further, since the magnetic material of amorphous metal is hard to be saturated, the peak current flowing in the winding can be increased. However, as the peak current becomes larger, the problem that the switching element is easily broken arises. On this account, the switching element is protected by improvement of the circuit in the embodiment.

Figure 2:
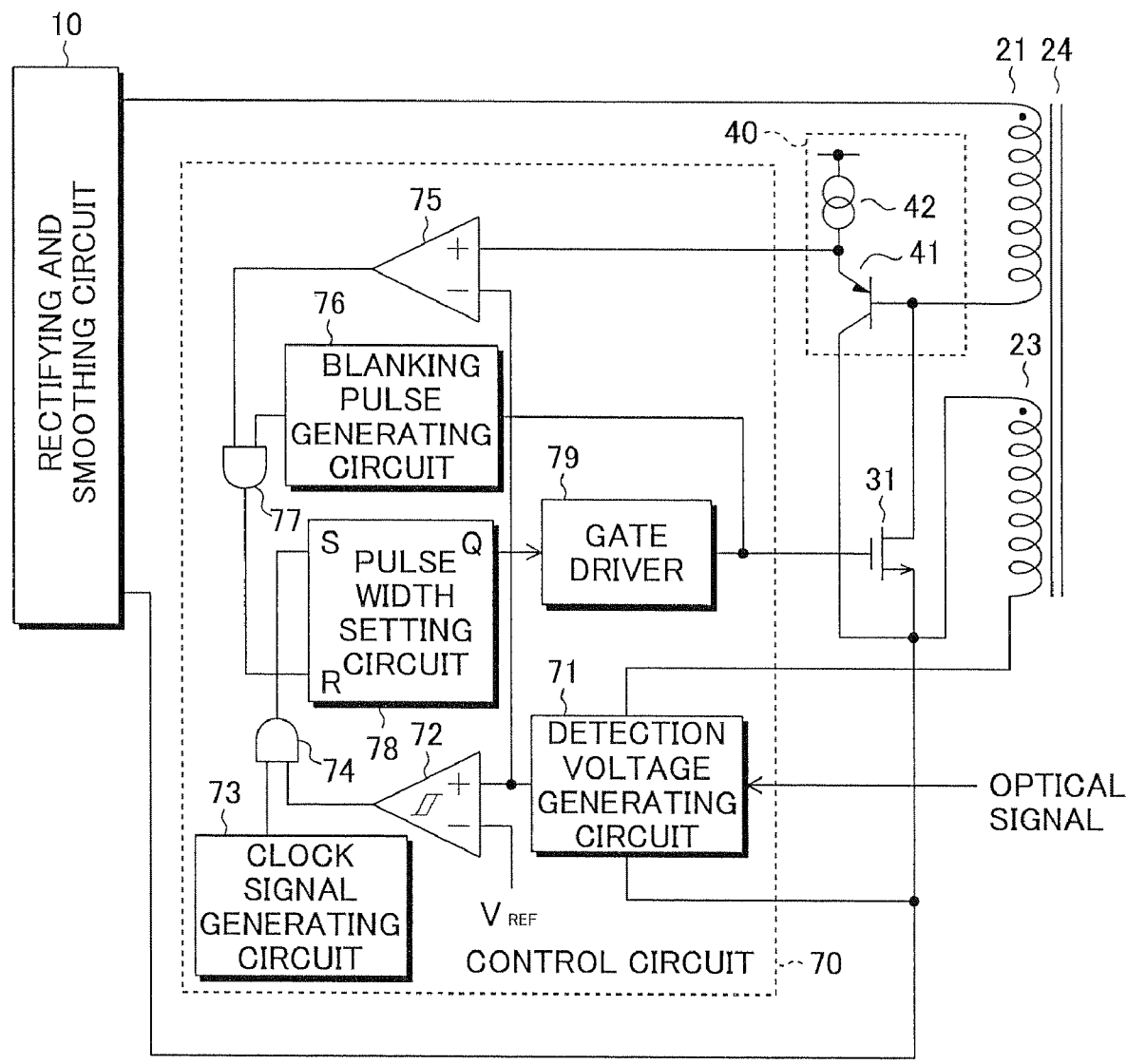
FIG. 2 specifically shows a configuration of a control circuit and so on in the first embodiment of the present invention.

FIG. 2 specifically shows the configuration of the control circuit and so on in the first embodiment of the present invention. In the embodiment, an N-channel MOSFET 31 is used as the switching element 30 as shown in FIG. 1. The MOSFET 31 has a drain connected to the primary-side winding 21 of the transformer, a source connected to the rectifying and smoothing circuit 10, and a gate to which a drive signal is applied from a gate driver 79.

The primary-side winding 21 of the transformer and the drain-source path of the MOSFET 31 are series-connected, and the voltage obtained by rectifying and smoothing the alternating-current power supply voltage in the rectifying and smoothing circuit 10 is supplied to the series circuit. The MOSFET 31 flows current through the primary-side winding 21 of the transformer according to the pulsive drive signal applied to the gate.

Usually, in order to detect the current flowing through the primary-side winding 21 of the transformer, a resistor is inserted in series with the primary-side winding 21 and the voltage between both terminals of the resistor is measured. In this case, power loss is generated due to the resistor. Accordingly, in the embodiment, the primary-side current detection circuit 40 detects the primary-side current based on a voltage between the drain and the source of the MOSFET 31.

The primary-side current detection circuit 40 includes a PNP bipolar transistor 41 and a current source 42 for supplying current to an emitter of the transistor 41. The transistor 41 has a base to which a potential is applied from the drain of the MOSFET 31, and outputs the detection voltage from the emitter by performing the emitter-follower operation. Although the base of the transistor 41 is directly connected to the drain of the MOSFET 31 in FIG. 2, the base may be indirectly connected to the drain of the MOSFET 31 via a resistor or transistor.

When the MOSFET 31 is turned on, the on-resistance between the drain and the source of the MOSFET 31 takes a value determined depending on the element characteristic and a voltage between the gate and the source. Since the primary-side winding 21 of the transformer as a load of the MOSFET 31 includes an inductance component, the drain current gradually increases from zero. The product of the drain current and the on-resistance of the MOSFET 31 becomes the voltage between the drain and the source of the MOSFET 31. Accordingly, the detection voltage proportional to the magnitude of the current flowing through the primary-side winding 21 of the transformer can be obtained by measuring the voltage between the drain and the source of the MOSFET 31.

The control circuit 70 includes a detection voltage generating circuit 71, a comparator 72, a clock signal generating circuit 73, an AND circuit 74, a comparator 75, a blanking pulse generating circuit 76, an AND circuit 77, a pulse width setting circuit 78, and a gate driver 79.

The detection result of the secondary-side voltage detection circuit 60 as shown in FIG. 1 is transmitted to the detection voltage generating circuit 71 as an optical signal by using an optical signal transmitting element such as a photocoupler. Thereby, the detection result of the secondary-side voltage detection circuit 60 can be transmitted to the detection voltage generating circuit 71 at the primary side while isolation is kept between the primary side and the secondary side of the transformer 20. The detection voltage generating circuit 71 generates a detection voltage based on the detection result of the secondary-side voltage detection circuit 60.

Figure 3:
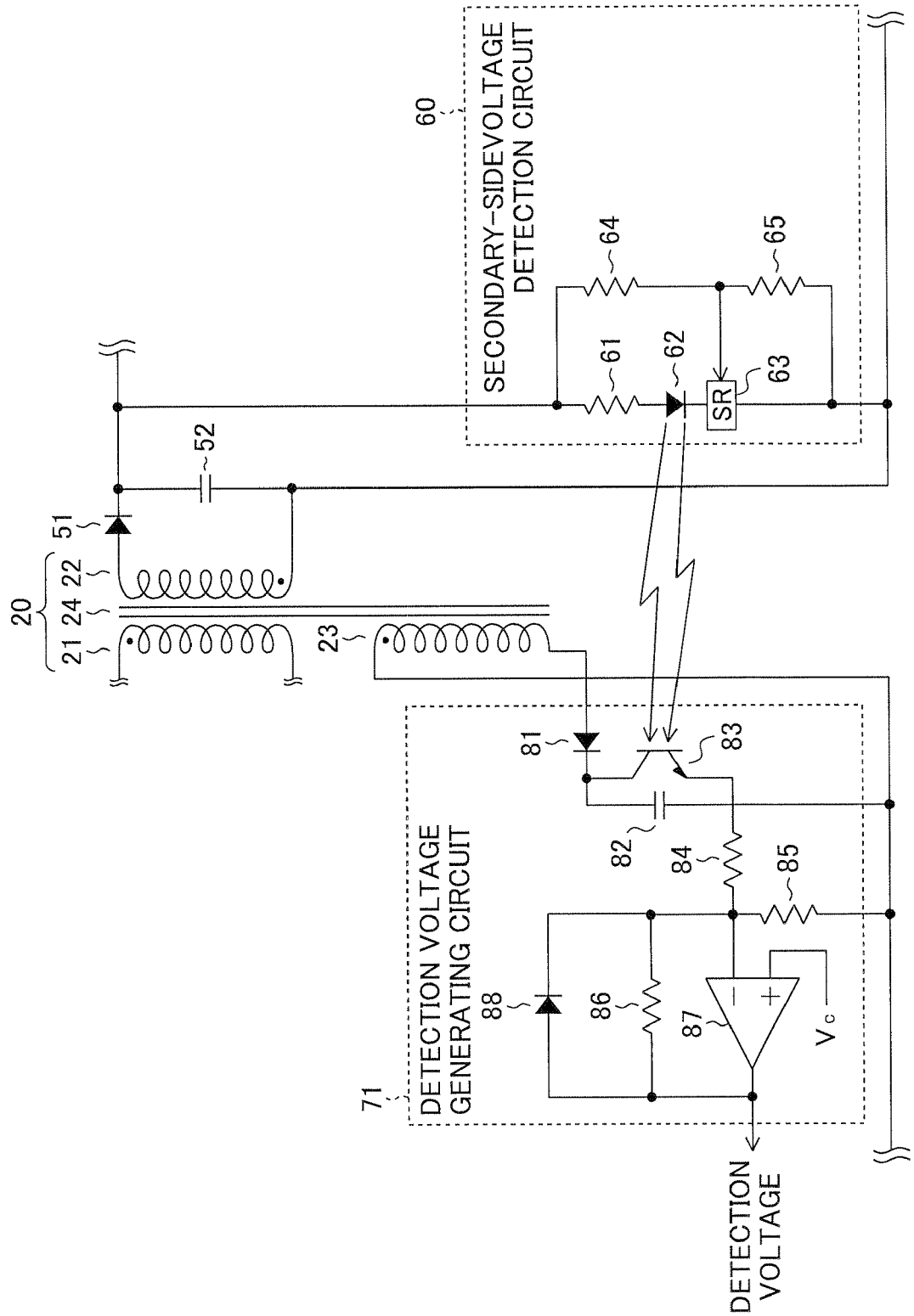
FIG. 3 is a circuit diagram showing a configuration example of a secondary-side voltage generating circuit as shown in FIG. 1 and a detection voltage generating circuit as shown in FIG. 2.

FIG. 3 is a circuit diagram showing a configuration example of the secondary-side voltage generating circuit as shown in FIG. 1 and the detection voltage generating circuit as shown in FIG. 2. In this example, the secondary-side voltage detection circuit 60 has a series-connected circuit of a resistor 61, a light emitting diode 62, and a shunt regulator 63 connected between both terminals of the capacitor 52, and resistors 64 and 65 for dividing the voltage generated between the both terminals of the capacitor 52. The voltage divided by the resistors 64 and 65 is applied to the control terminal of the shunt regulator 63. Thereby, when the secondary-side voltage exceeds a predetermined voltage, current flows through the light emitting diode 62, and the light emitting diode 62 emits light in intensity according to the magnitude of the current to generate an optical signal.

The detection voltage generating circuit 71 has a diode 81 for rectifying the voltage generated in the auxiliary winding 23 of the transformer, a capacitor 82 for smoothing the voltage rectified by the diode 81, a phototransistor 83 having a collector to which the voltage smoothed by the capacitor 82 is applied, resistors 84-86, an operational amplifier 87, and a diode 88 for limiter.

The light emitting diode 62 and the phototransistor 83 are typically configured as a photocoupler, and the phototransistor 83 receives the optical signal generated by the light emitting diode 62 and outputs current depending on the intensity of the signal from the emitter. The current outputted from the emitter of the phototransistor 83 is entered into the inverting input terminal of the operational amplifier 87 via the resistor 84.

Further, the resistors 85 and 86 are connected to the inverting input terminal of the operational amplifier 87, and thereby, a negative feedback loop is configured. A control voltage $V_C$ is applied to a non-inverting input terminal of the amplifier, and a detection voltage depending on the output current of the phototransistor 83 is generated according to them. When the load at the secondary side is light, the voltage at the secondary side rises and the detection voltage falls. When the load at the secondary side is heavy, the voltage at the secondary side falls and the detection voltage rises.

Furthermore, the diode 88 for limiter is connected between the output terminal and the non-inverting input terminal of the operational amplifier 87. Through the diode 88 for limiter, the upper limit is set for the detection voltage outputted from the operational amplifier 87. Although one diode is shown in FIG. 3, plural diodes may be series-connected. The upper limit of the detection voltage can be changed according to the number of diodes.

Referring to FIG. 2 again, the comparator 72 has a schmitt trigger characteristic, and compares the detection voltage generated by the detection voltage generating circuit 71 and the reference voltage $V_{REF}$ to determine the condition of the load at the secondary side and output a load condition signal representing whether or not the condition is a light load condition as a determination result. The clock signal generating circuit 73 generates a clock signal. The AND circuit 74 obtains logical multiplication of the load condition signal and the clock signal.

In the light load condition, the detection voltage falls and the load condition signal reaches the low level and the output signal of the AND circuit 74 is fixed at the low level, and thereby, the pulse width setting circuit 78 generates no pulse. On the other hand, when the output voltage at the secondary side falls, the detection voltage rises and the load condition signal reaches the high level, the clock signal generated by the clock signal generating circuit 73 is supplied from the AND circuit 74 to the pulse width setting circuit 78, and thereby, the pulse width setting circuit 78 generates plural pulses in synchronization with the clock signal. In this manner, the control circuit 70 can intermittently operate the switching element 30 by reducing the number of pulses in the drive signal when the circuit determines that the secondary side is in the light load condition.

The comparator 75 compares the detection voltage outputted from the primary-side current detection circuit 40 with the detection voltage generated by the detection voltage generating circuit 71 based on the detection result of the output voltage at the secondary side to generate a comparison signal representing a comparison result. Further, the blanking pulse generating circuit 76 generates a blanking pulse signal which becomes at a high level only in a predetermined period in synchronization with the clock signal for preventing the false operation that the MOSFET 31 is turned off while the primary-side current of the transformer is still small. In the period in which the blanking pulse signal is at the high level, the comparison signal generated by the comparator 75 is outputted from the AND circuit 77.

The pulse width setting circuit 78 is configured by an RS flip-flop having a set terminal S, reset terminal R, and an output terminal Q, for example. The pulse width setting circuit 78 sets an output signal in synchronization with the clock signal generated by the clock signal generating circuit 73 when the load condition signal is at the high level, and resets the output signal in synchronization with the comparison signal generated by the comparator 75 when the blanking pulse signal is at the high level so as to set the pulse width in the drive signal. The gate driver 79 drives the gate of the MOSFET 31 according to the drive signal outputted from the pulse width setting circuit 78.

Figure 4:
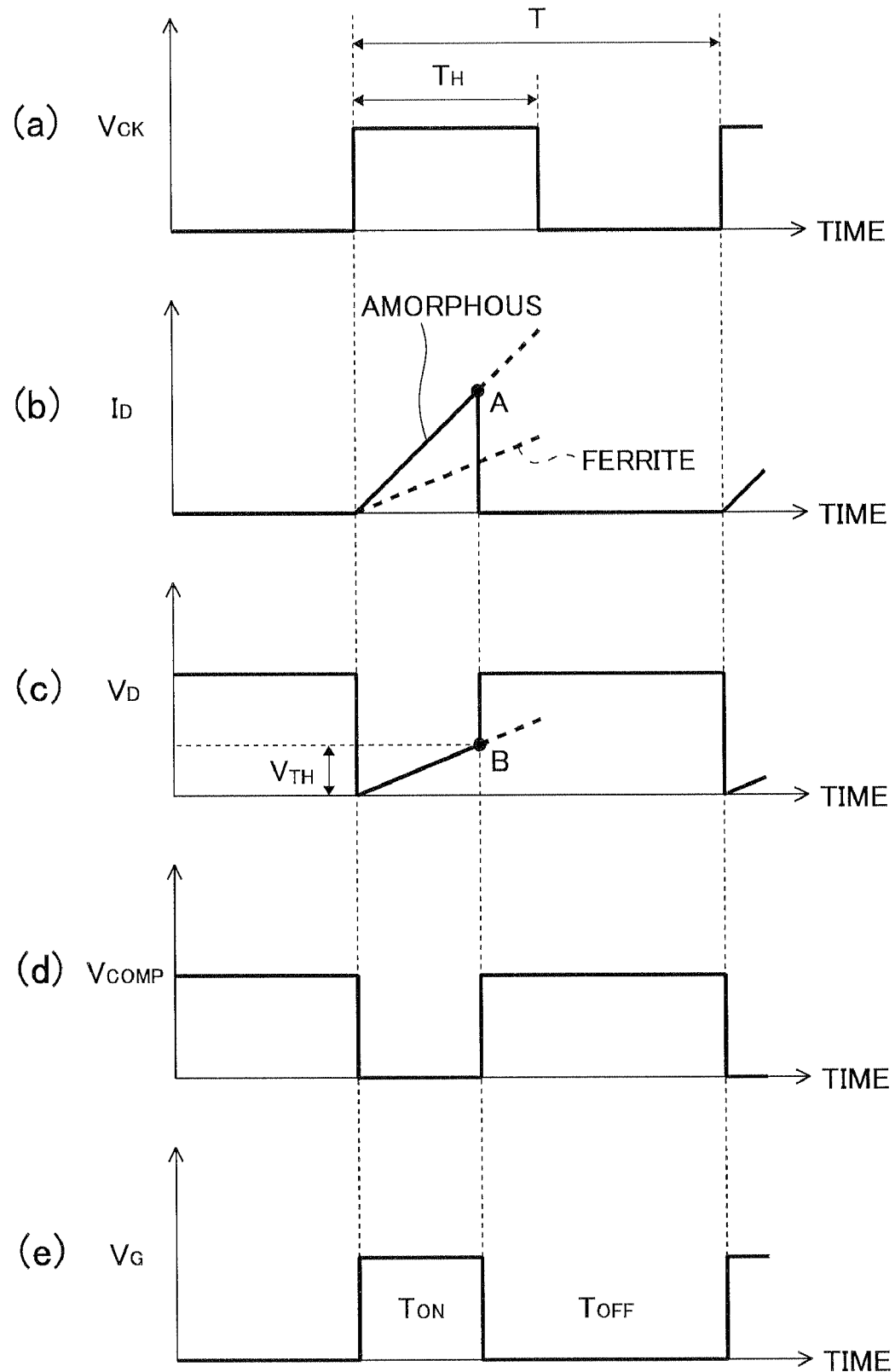
FIG. 4 is a waveform chart for explanation of an operation in an overload condition of the control circuit as shown in FIG. 2.

Next, an operation of the control circuit as shown in FIG. 2 will be explained with reference to FIGS. 4 and 5. FIG. 4 is a waveform chart for explanation of an operation of the control circuit as shown in FIG. 2 in the overload condition.

FIG. 4 (a) shows a clock signal $V_{CK}$ generated by the clock signal generating circuit 73. The period of pulses included in the clock signal is T, and the pulse width (the period at the high level) is $T_H$. Here, the duty of the clock signal ($T_H/T$) is 50%.

In the present invention, since a magnetic material of amorphous metal is used for the core of the transformer, when the numbers of turns are the same, the impedance of the primary side winding is smaller compared to the case of using ferrite. Accordingly, as shown in FIG. 4 (b), the current flowing through the primary side winding, i.e., the value of the drain current $I_D$ of the MOSFET 31 is greater compared to the case of using ferrite, and the MOSFET 31 may be broken due to heat generation. On the other hand, in order to increase the impedance of the winding, the number of turns must be increased and the transformer will be upsized. On this account, the problem has been solved by the following technique in the embodiment.

As the primary-side current of the transformer increases, the speed at which energy is accumulated in the core is faster. Further, when the power consumption of a dynamic load such as a printer instantaneously becomes greater, that can be accommodated by increasing the period for flowing the drain $I_D$. In this regard, if the upper limit is provided for the period for flowing the drain current $I_D$, the power consumption returns to its initial condition before the temperature of the MOSFET 31 abnormally rises, and there is no fear of failure of the MOSFET 31. For such an operation, the control circuit 70 sets the upper limit of the pulse width in the drive signal such that the MOSFET 31 is turned off at point A as shown in FIG. 4 (b).

The operation of the control circuit 70 will be specifically explained. The output signal of the pulse width setting circuit 78 is set in synchronization with the rising edge of the clock signal $V_{CK}$ generated by the clock signal generating circuit 73, and the gate voltage $V_G$ as shown in FIG. 4 (e) reaches the high level. Thereby, the comparison signal $V_{COMP}$ as shown in FIG. 4 (d) outputted from the comparator 75 transfers from the high level to the low level.

Here, the comparison signal $V_{COMP}$ outputted from the comparator 75 is obtained by the comparison between the first detection voltage outputted from the primary-side current detection circuit 40 and the second detection voltage generated by the detection voltage generating circuit 71 based on the detection result of the secondary-side voltage detection circuit 60. In the overload condition, the drain current $I_D$ of the MOSFET 31 increases and the first detection voltage increases, and the output voltage at the secondary side of the transformer decreases and the second detection voltage also increases. Since the upper limit is provided to the second detection voltage in the detection voltage generating circuit 71, when the second detection voltage reaches the upper limit, if the first detection voltage exceeds the upper limit, the comparison signal $V_{COMP}$ outputted from the comparator 75 reaches the high level.

Since the primary-side current detection circuit 40 generates the detection voltage based on the drain voltage $V_D$ of the MOSFET 31, the above-mentioned operation will be explained according to the drain voltage $V_D$ as shown in FIG. 4 (c). When the gate voltage $V_G$ reaches the high level, the drain current $I_D$ starts to flow. The drain current $I_D$ once decreases, and the comparison signal $V_{COMP}$ outputted from the comparator 75 transfers from the high level to the low level. Then, the drain current $I_D$ gradually increases and the drain voltage $V_D$ gradually rises. At point B as shown in FIG. 4 (c), the drain voltage $V_D$ exceeds the threshold voltage $V_{TH}$ determined based on the detection result of the secondary-side voltage detection circuit 60 (in this case, corresponding to the upper limit of the second detection voltage), the comparison signal $V_{COMP}$ outputted from the comparator 75 reaches the high level. Consequently, the output signal of the pulse width setting circuit 78 is reset, the gate voltage $V_G$ reaches the low level, and the drain current $I_D$ stops at point A as shown in FIG. 4 (b).

In this manner, the control circuit 70 turns on the MOSFET 31 in a fixed cycle and turns off the MOSFET 31 in synchronization with the rising edge of the comparison signal $V_{COMP}$. In FIG. 4 (e), the period in which the MOSFET 31 is turned on is represented by $T_{ON}$ and the period in which the MOSFET 31 is turned off is represented by $T_{OFF}$.

Figure 5:
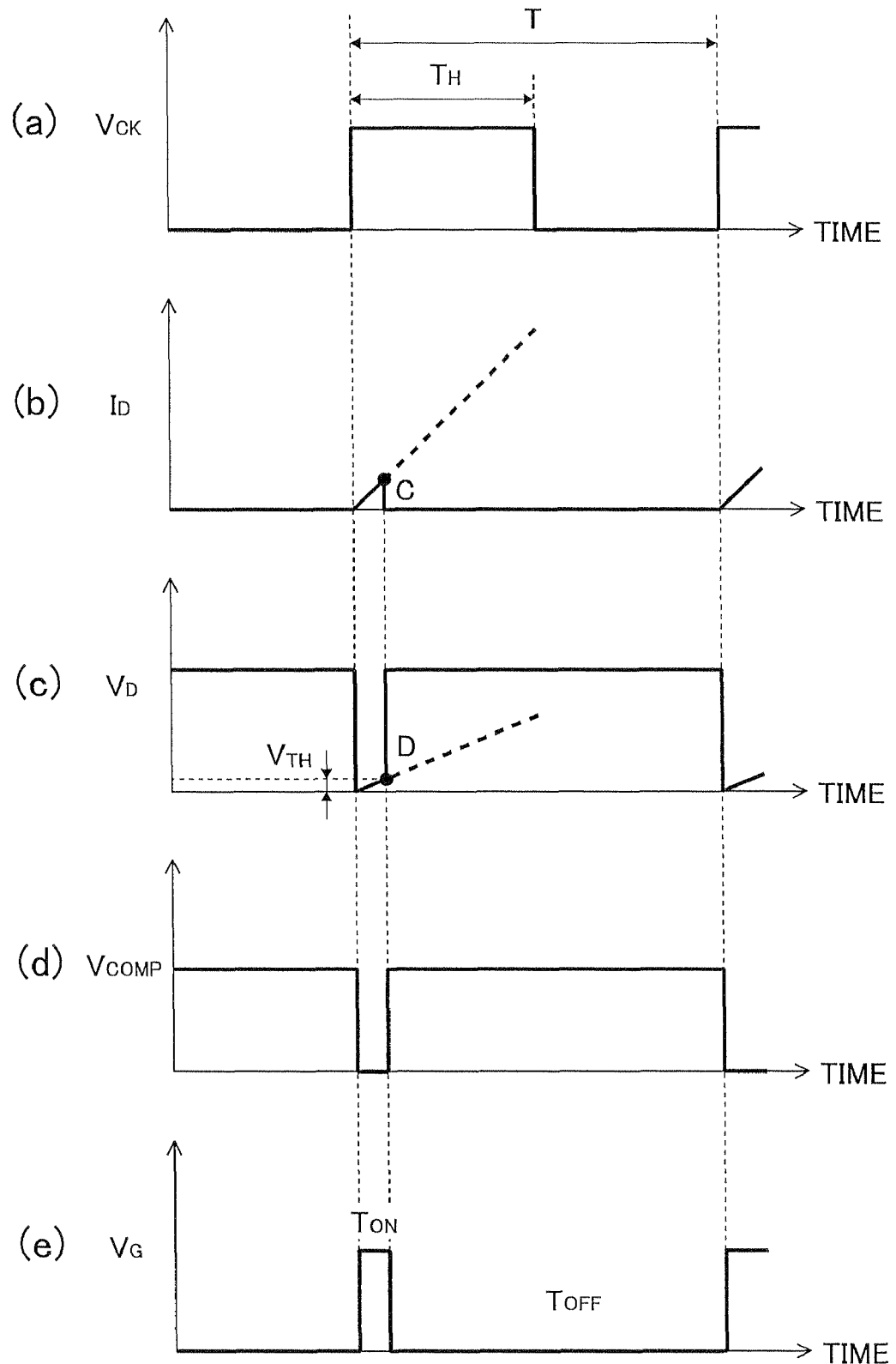
FIG. 5 is a waveform chart for explanation of an operation in a normal condition of the control circuit as shown in FIG. 2.

FIG. 5 is a waveform chart for explanation of an operation of the control circuit as shown in FIG. 2 in the normal condition. FIG. 5 (a) shows a clock signal $V_{CK}$ generated by the clock signal generating circuit 73. Further, FIG. 5 (b) shows the drain current $I_D$ of the MOSFET 31 and FIG. 5 (c) shows the drain voltage $V_D$ of the MOSFET 31.

In the normal condition, since the secondary-side load is lighter than that in the overload condition, the output voltage at the secondary side rises and the second detection voltage generated by the detection voltage generating circuit 71 based on the detection result of the secondary-side voltage detection circuit 60 is lower. Therefore, as shown in FIG. 5 (c), the threshold voltage $V_{TH}$ determined based on the detection result of the secondary-side voltage detection circuit 60 is also lower. Consequently, the period from the time when the drain current $I_D$ starts to flow to the time when the drain voltage $V_D$ exceeds the threshold voltage $V_{TH}$ is shorter. At point D as shown in FIG. 5 (c), when the drain voltage $V_D$ exceeds the threshold voltage $V_{TH}$, the comparison signal $V_{COMP}$ outputted from the comparator 75 as shown in FIG. 5 (d) reaches the high level. Consequently, the output signal of the pulse width setting circuit 78 is reset, the gate voltage $V_G$ of the MOSFET 31 as shown in FIG. 5 (e) reaches the low level, and the drain current $I_D$ stops at point C as shown in FIG. 5(b). In this manner, in the normal condition, the period in which the drain current $I_D$ is flown through the MOSFET 31 is shortened.

Furthermore, in the light load condition, the comparator 72 of the control circuit 70 judges that the secondary side is in the light load condition based on the detection voltage generated by the detection voltage generating circuit 71, and sets the comparison signal at the low level. Consequently, the output signal of the AND circuit 74 also reaches the low level, the clock signal is no longer supplied to the pulse width setting circuit 78, and the number of pulses in the drive signal decreases.

In the embodiment, as shown in FIG. 2, the logical multiplication of the comparison signal outputted from the comparator 75 and the blanking pulse signal generated by the blanking pulse generating circuit 76 is obtained by the AND circuit 77, however, the operation of the primary-side current detection circuit 40 may be turned on and off by using the blanking pulse signal generated by the blanking pulse generating circuit 76. In this case, the AND circuit 77 may be omitted.

Next, a switching power supply circuit according to the second embodiment of the present invention will be explained. The basic configuration of the switching power supply circuit according to the second embodiment is the same as that of the first embodiment as shown in FIG. 1 except for the control circuit.

Figure 6:
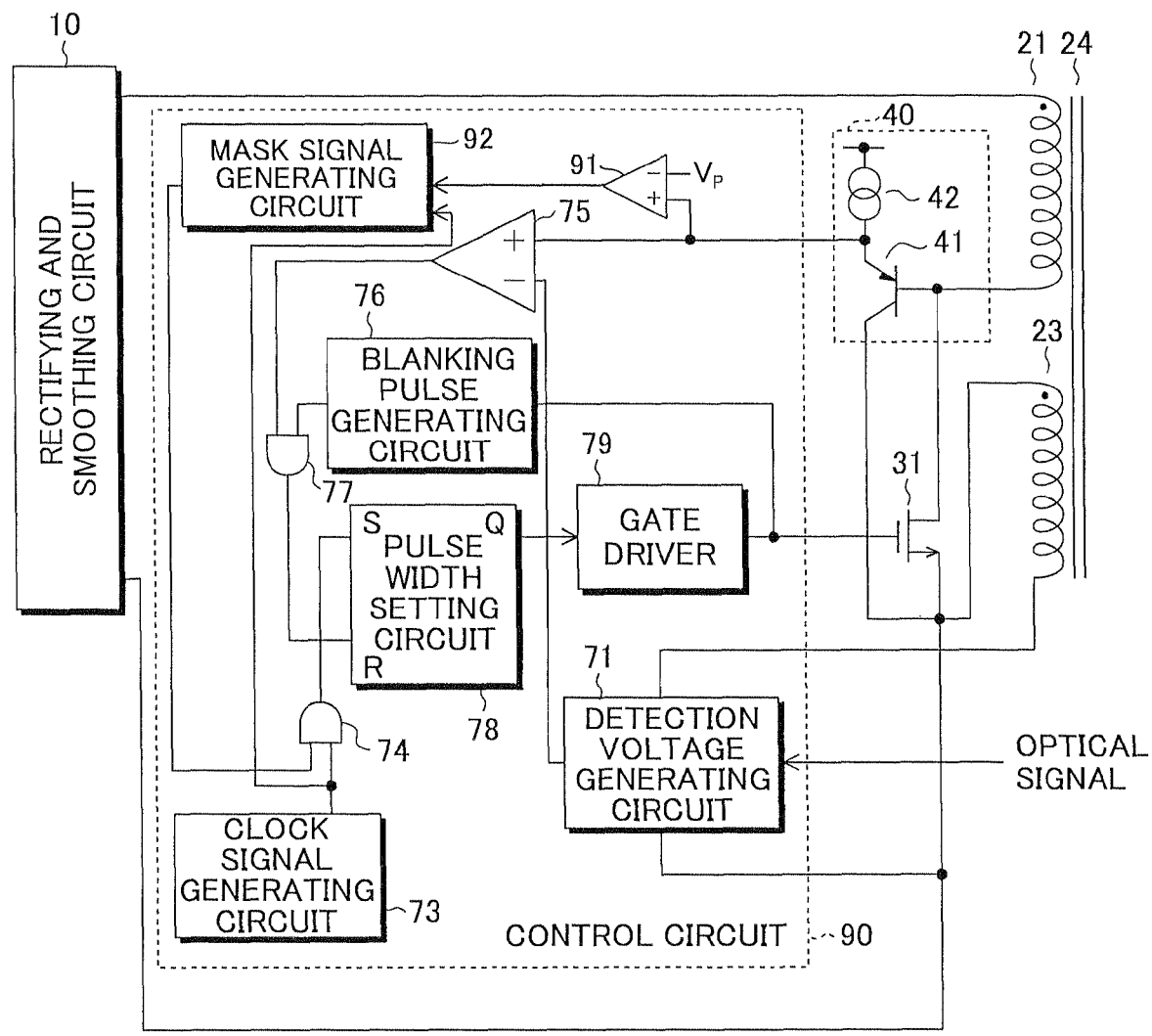
FIG. 6 specifically shows a configuration of a control circuit and so on in the second embodiment of the present invention.

FIG. 6 specifically shows the configuration of the control circuit and so on in the second embodiment of the present invention. In the embodiment, a control circuit 90 judges whether or not the current flowing in the MOSFET 31 exceeds the rated current and generates the drive signal to be applied to the gate of the MOSFET 31 in accordance therewith. Here, the rated current refers to the magnitude of the drain current that the MOSFET can stably perform the steady operation, and determined in advance based on the AC input voltage of the switching power supply circuit, the MOSFET standard, or the like.

The control circuit 90 includes a comparator 91 and a mask signal generating circuit 92 in place of the comparator 72 as shown in FIG. 2. The comparator 91 compares the magnitude of the primary side current detected by the primary-side current detection circuit 40 with a preset voltage $V_P$ set according to the rated current, and outputs a comparison signal representing the comparison result. The mask signal generating circuit 92 determines the operation mode of the MOSFET 31 based on the comparison signal outputted from the comparator 91, and generates a mask signal adaptable to the operation mode.

The AND circuit 74 obtains the logical multiplication of the clock signal outputted from the clock signal generating circuit 73 and the mask signal outputted from the mask signal generating circuit 92. In a period in which the mask signal is at the high level, the clock signal is supplied to the set terminal S of the pulse width setting circuit 78. The pulse width setting circuit 78 sets the output signal in synchronization with the clock signal and resets the output signal in synchronization with the comparison signal generated by the comparator 75 when the blanking pulse signal is at the high level, and thereby, sets up the pulse width in the drive signal. The gate driver 79 drives the gate of the MOSFET 31 according to the drive signal outputted from the pulse width setting circuit 78.

Figure 7:
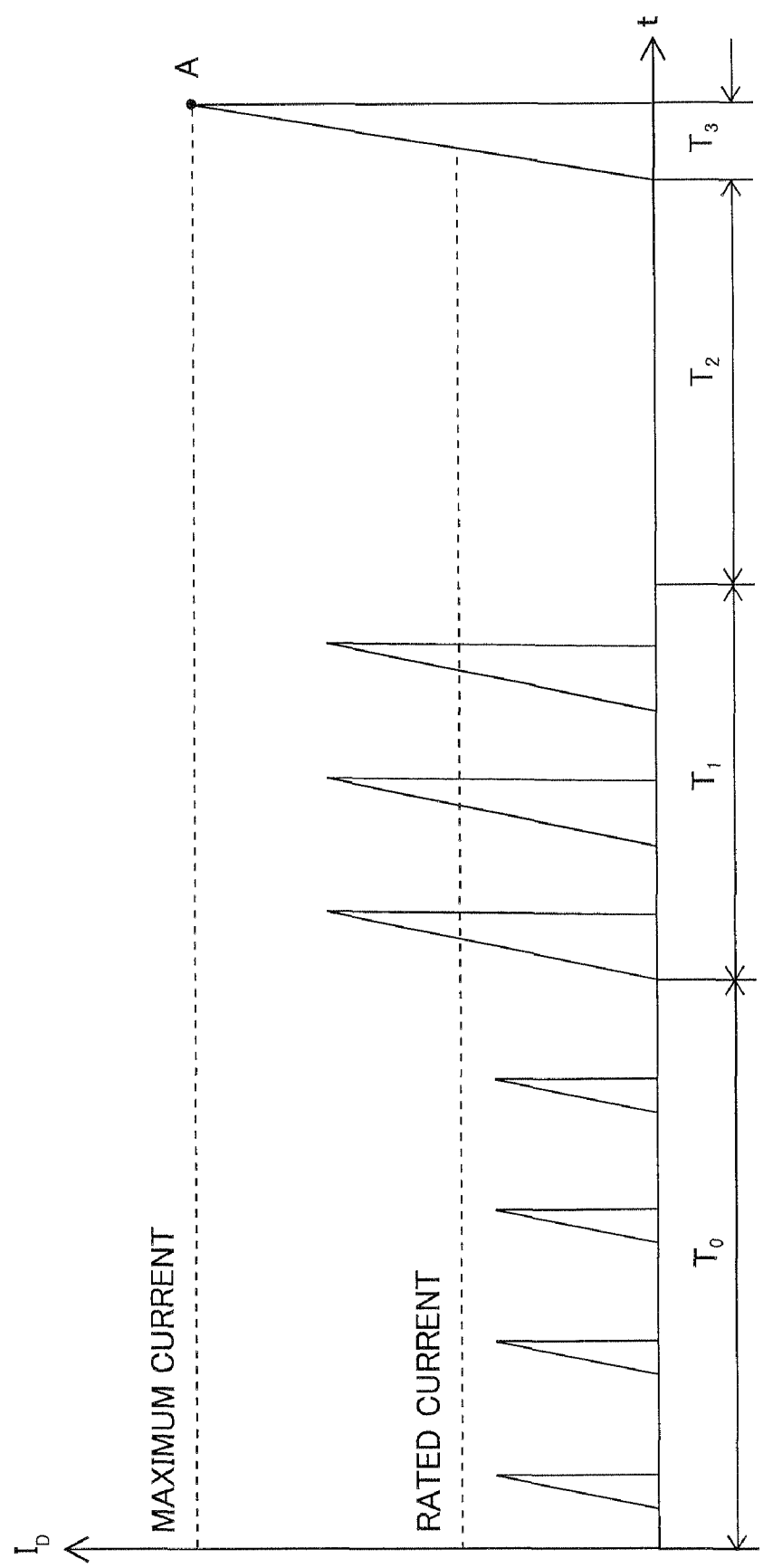
FIG. 7 is a waveform chart of drain current for explanation of an operation of the switching power supply circuit according to the second embodiment of the present invention.

FIG. 7 is a waveform chart of drain current for explanation of an operation of the switching power supply circuit according to the second embodiment of the present invention. In a period $T_0$, the drain current $I_D$ of the MOSFET 31 does not exceed the rated current, and thus, the comparison signal outputted from the comparator 91 is maintained at the low level. Based on the comparison signal, the mask signal generating circuit 92 determines the operation mode of the MOSFET 31 as the normal load mode, and fixes the mask signal at the high level. Therefore, the clock signal outputted from the clock signal generating circuit 73 is supplied to the pulse width setting circuit 78 via the AND circuit 74. Consequently, the plural pulses continuous in synchronization with the clock signal are applied to the gate of the MOSFET 31.

In a period $T_1$, when the secondary side is in the overload condition and the drain current $I_D$ of the MOSFET 31 periodically exceeds the rated current, the comparison signal outputted from the comparator 91 periodically reaches the high level in synchronization with the clock signal. Based on the comparison signal, the mask signal generating circuit 92 determines the operation mode of the MOSFET 31 as the overload mode, and limits the period in which the mask signal is at the high level for protecting the MOSFET 31 such that the MOSFET 31 performs the intermittent operation.

For example, the mask signal generating circuit 92 increments the count value in synchronization with the rising edge of the comparison signal outputted from the comparator 91, sets the mask signal at the high level in the first period $T_1$ until the count value becomes a predetermined value, and sets the mask signal at the low level in the subsequent second period $T_2$. As long as the overload condition continues, the first period $T_1$ and the second period $T_2$ are repeated.

Consequently, in the first period $T_1$, the plural pulses continuous in synchronization with the clock signal are applied to the gate of the MOSFET 31, and necessary current can be supplied even to the dynamic load while the constant voltage characteristic is maintained. On the other hand, in the second period $T_2$, no pulse is applied to the gate of the MOSFET 31. In this manner, the upper limit of the period in which plural pulses continue in synchronization with the clock signal is set in the drive signal, and therefore, the upper limit of the period, in which the MOSFET 31 flows current through the primary-side winding of the transformer, is set. In the first period $T_1$, when the comparison signal reaches the low level in the next cycle to the cycle when the comparison signal reaches the high level, the mask signal generating circuit 92 changes the operation mode of the MOSFET 31 from the overload mode to the normal load mode.

When the load at the secondary side becomes heavier and very large drain current $I_D$ flows, the upper limit of the pulse width in the drive signal is set as explained in the first embodiment. That is, by setting the upper limit for the detection voltage in the detection voltage generating circuit 71, as shown in FIG. 7, the upper limit of the pulse width in the drive signal is set to a period $T_3$, and the drain current $I_D$ of the MOSFET 31 is suppressed equal to or less than the maximum current (point A).

In the first and second embodiments, the drive signal may be generated based on the detection result of the primary-side current detection circuit 40 by applying a predetermined voltage in place of the detection voltage generated by the detection voltage generating circuit 71 to the inverting input terminal of the comparator 75. Also in this case, when the detection voltage outputted from the primary-side current detection circuit 40 exceeds a predetermined voltage, the output signal of the pulse width setting circuit 78 is reset, and thereby, the upper limit of the pulse width in the drive signal can be set.

Further, in the first and second embodiments, the example in which the primary-side current detection circuit 40 detects the primary-side current based on the voltage between the drain and the source of the MOSFET 31 has been explained, however, the present invention is not limited to that, but the primary-side current detection circuit may detect the primary-side current based on the induced current of the auxiliary winding (the tertiary winding).

Next, the third embodiment of the present invention will be explained.

Figure 8:
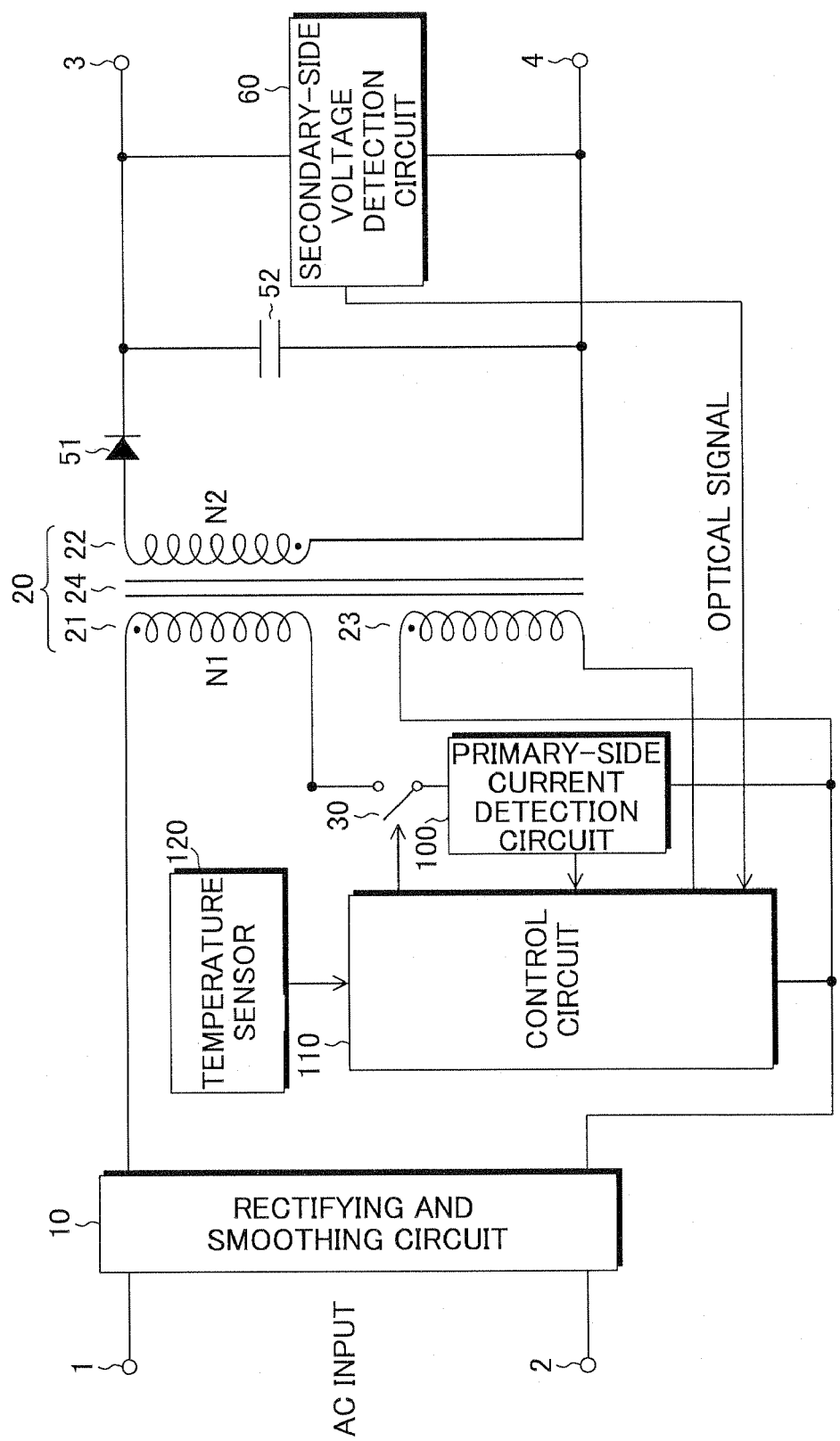
FIG. 8 shows a configuration of a switching power supply circuit according to the third embodiment of the present invention.

FIG. 8 shows a configuration of a switching power supply circuit according to the third embodiment of the present invention. This switching power supply circuit has a rectifying and smoothing circuit 10 connected to input terminals 1 and 2 for an alternating-current power supply voltage, a transformer 20 for stepping up or stepping down the alternating-current voltage at the primary side and outputs it to the secondary side, a switching element 30 series-connected to a primary-side winding 21 of the transformer, for flowing current through the primary-side winding 21 of the transformer according to a pulsive drive signal, and a primary-side current detection circuit 100 for detecting the current flowing through the primary-side winding of the transformer 20.

Further, the switching power supply circuit has a diode 51 for half-wave rectifying a voltage generated in a secondary-side winding 22 of the transformer, a capacitor 52 for smoothing the rectified voltage and supplying it to output terminals 3 and 4, a secondary-side voltage detection circuit 60 for detecting output voltage between the output terminals 3 and 4, a control circuit 110 for setting a pulse width in the drive signal, and a temperature sensor 120 for sensing the ambient temperature of the heat generating switching element 30.

The detection result of the secondary-side voltage detection circuit 60 is transmitted to the control circuit 110 as an optical signal. Thereby, the detection result at the secondary side can be transmitted to the primary side while isolation is kept between the primary side and the secondary side of the transformer 20.

Figure 9:
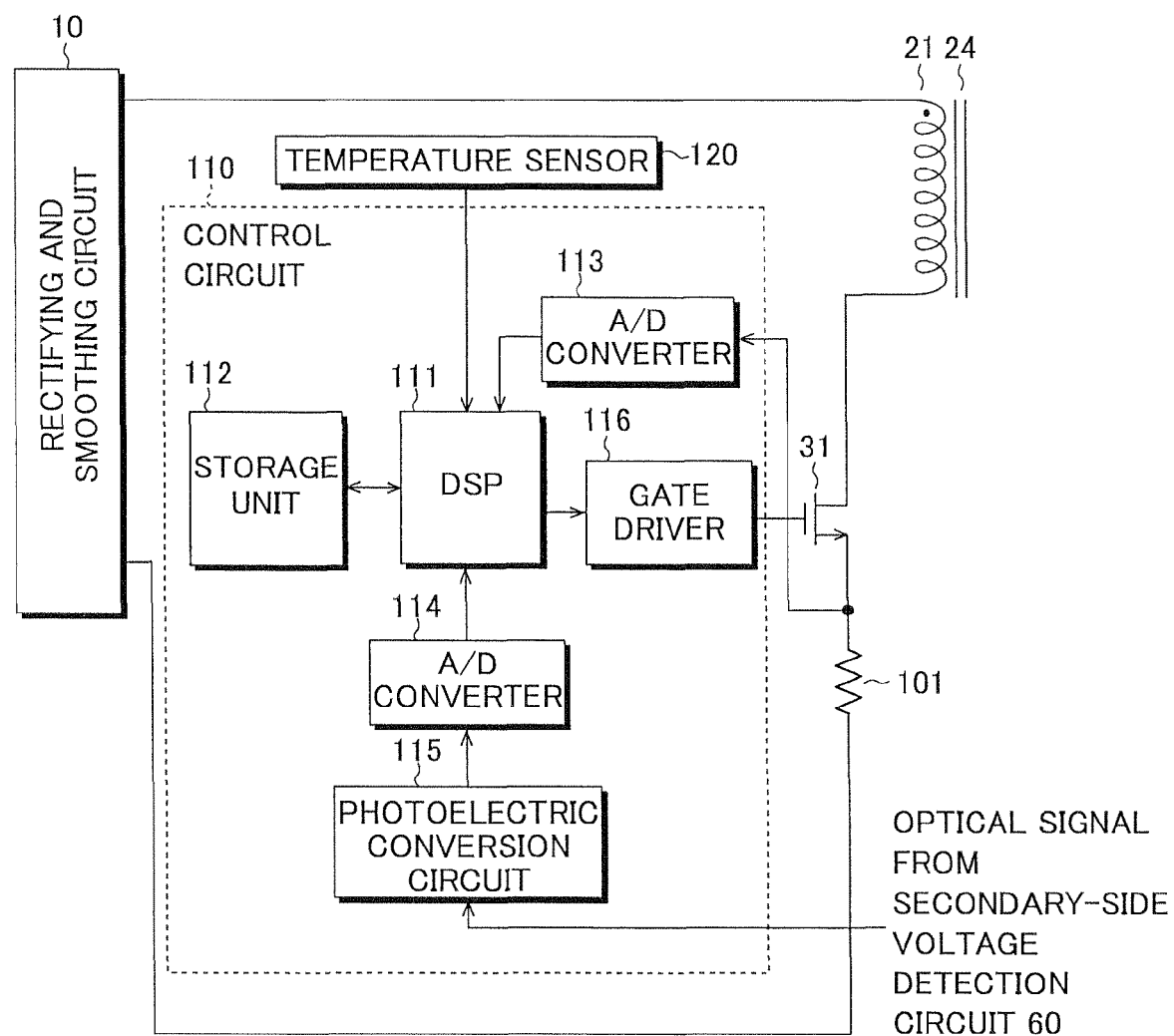
FIG. 9 specifically shows a configuration of a control circuit and so on as shown in FIG. 8.

FIG. 9 specifically shows the configuration of the control circuit and so on as shown in FIG. 8. In the embodiment, an N-channel MOSFET 31 is used as the switching element 30 as shown in FIG. 8, and a resistor 101 is used as the primary-side current detection circuit 100. The MOSFET 31 has a drain connected to the primary-side winding 21 of the transformer, a source connected to the rectifying and smoothing circuit 10 via the resistor 101, and a gate to which a drive signal is applied from a gate driver 116. The detection voltage proportional to the magnitude of the current flowing through the primary-side winding 21 of the transformer can be obtained by measuring the voltage generated between both terminals of the resistor 101.

The primary-side winding 21 of the transformer, the drain-source path of the MOSFET 31, and the resistor 101 are series-connected, and the voltage obtained by rectifying and smoothing the alternating-current power supply voltage in the rectifying and smoothing circuit 10 is supplied to the series circuit. The MOSFET 31 flows current through the primary-side winding 21 of the transformer according to the pulsive drive signal applied to the gate.

The control circuit 110 has a DSP (digital signal processor) 111 integrally including a control block for generating a drive signal, a storage unit 112 such as a nonvolatile memory for storing software (control programs) and data, A/D converters 113 and 114, a photoelectric conversion circuit 115, and a gate driver 116. The storage unit 112 stores a data table and the data table includes various kinds of setting information to be used for controlling the operation of the switching power supply circuit.

The A/D converter 113 converts the primary-side current detection signal as an analog signal obtained by the resistor 101 into a digital signal and outputs it to the DSP 111. A photocoupler is typically used as the light emitting diode 62 (FIG. 3) and the photoelectric conversion circuit 115. The photoelectric conversion circuit 115 receives the optical signal generated by the light emitting diode 62 of the secondary-side voltage detection circuit 60 and outputs a signal depending on its intensity. The signal is used as a secondary-side current detection signal. The A/D converter 114 converts the secondary-side current detection signal as an analog signal obtained by the photoelectric conversion circuit 115 into a digital signal and outputs it to the DSP 111.

The DSP 111 performs pulse width modulation (PWM) based on at least the detection signals outputted from the primary-side current detection circuit 100 and the secondary-side voltage detection circuit 60, and generates a drive signal (PWM signal). The DSP 111 may generate the drive signal by performing pulse width modulation based on temperature data outputted from the temperature sensor 120 in addition to those detection signals. The drive signal is applied to the gate of the MOSFET 31 by the gate driver 116.

Figure 10:
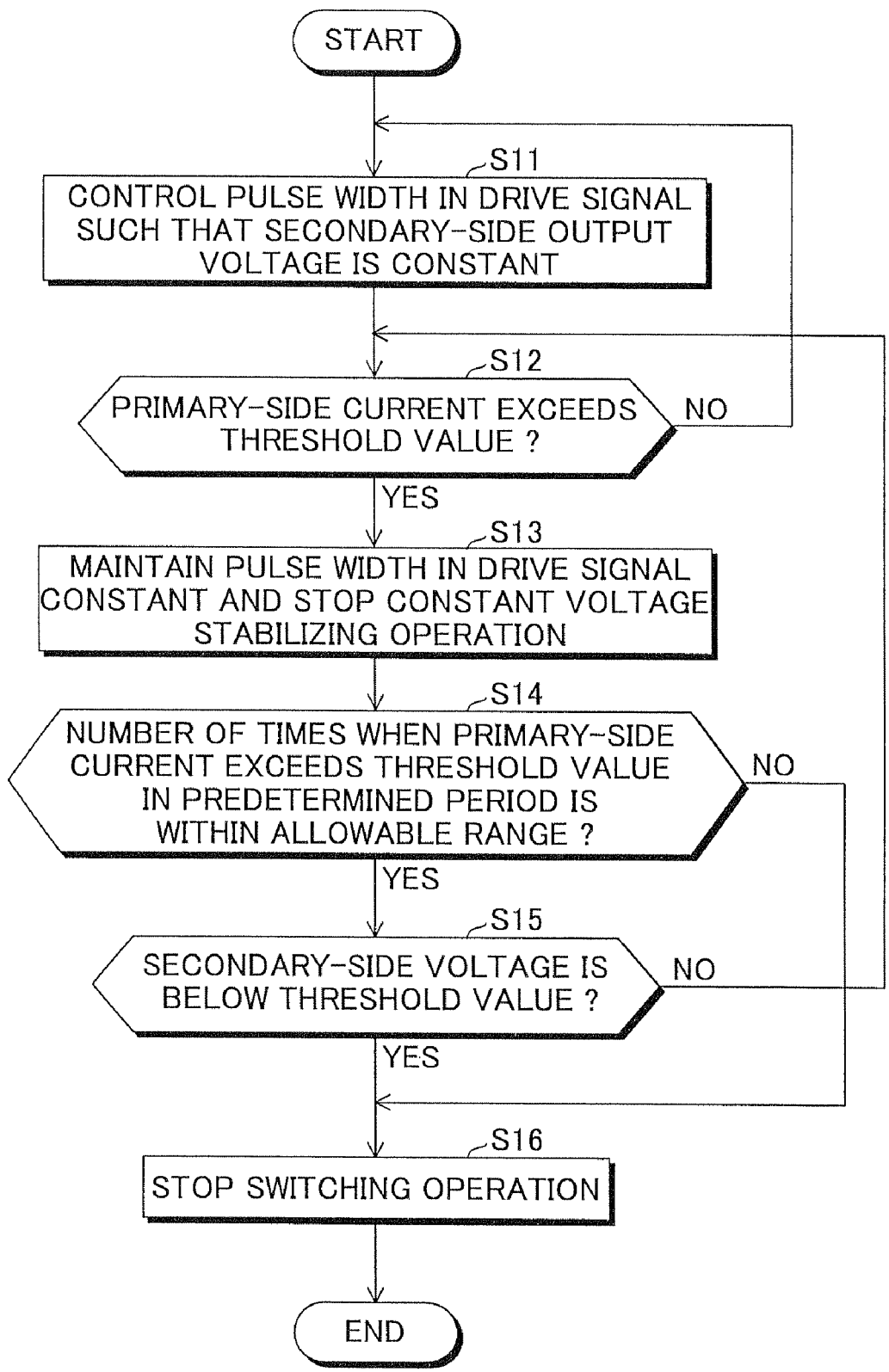
FIG. 10 is a flowchart showing a control operation of a DSP as shown in FIG. 9.

Next, an operation of the switching power supply circuit as shown in FIG. 8 will be explained with reference to FIGS. 8-12. FIG. 10 is a flowchart showing a control operation of the DSP as shown in FIG. 9, FIG. 11 shows output current to output voltage characteristics (secondary-side current to secondary-side voltage characteristics) of the switching power supply circuit as shown in FIG. 8, and FIG. 12 is a waveform chart showing operation waveforms in the switching power supply circuit as shown in FIG. 8.

Referring to FIG. 10, first, at step S11, the DSP 111 controls the pulse width in the drive signal so as to perform a constant voltage stabilizing operation by which the secondary-side voltage represented by the output value of the A/D converter 114 is constant. Further, at step S12, the DSP 111 judges whether or not the primary-side current represented by the output value of the A/D converter 113 exceeds a threshold value and controls the pulse width in the drive signal so as to perform the constant voltage stabilizing operation before the primary-side current exceeds the threshold value.

Figure 11:
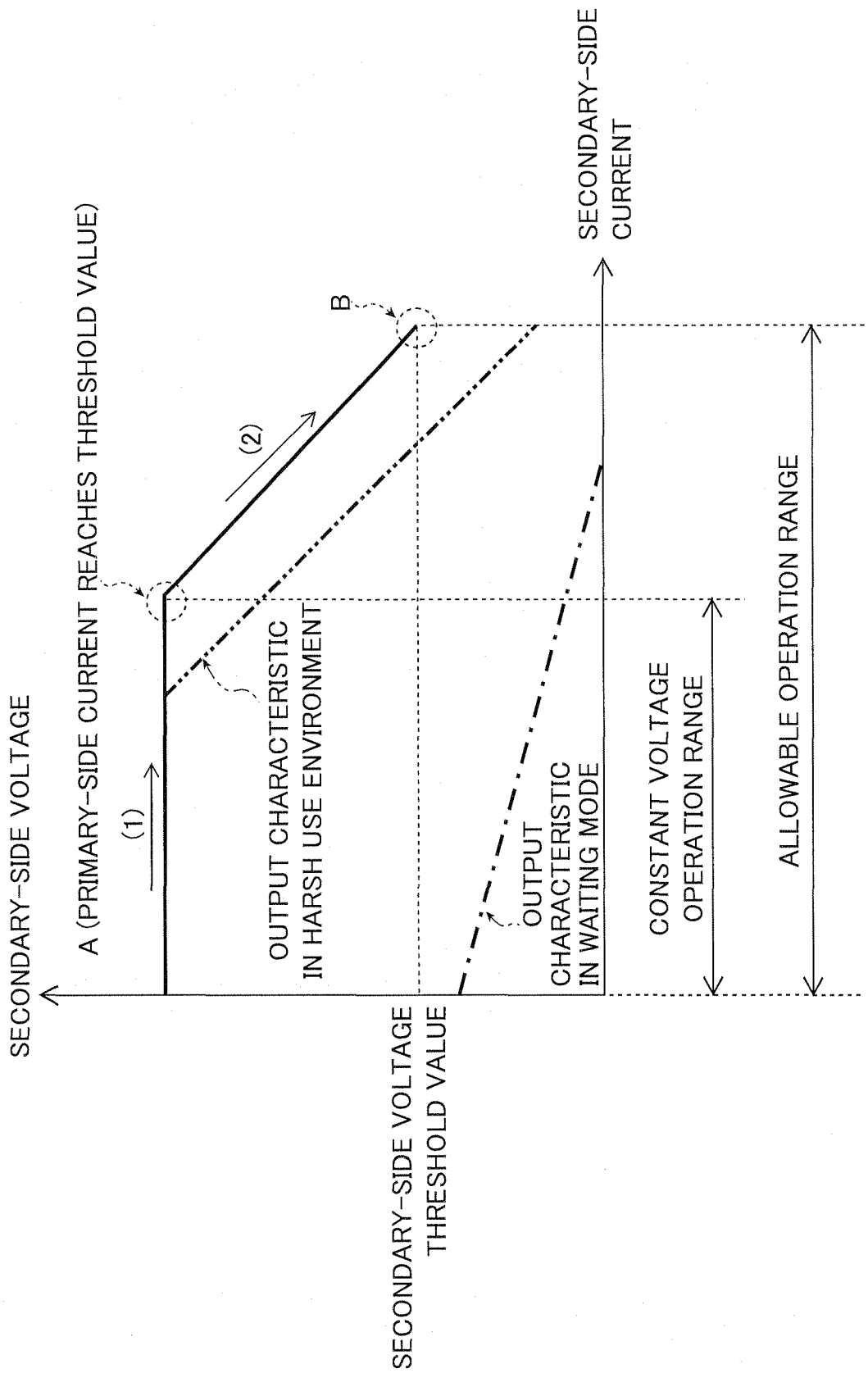
FIG. 11 shows output current to output voltage characteristics (secondary-side current to secondary-side voltage characteristics) of the switching power supply circuit as shown in FIG. 8.
Figure 12:
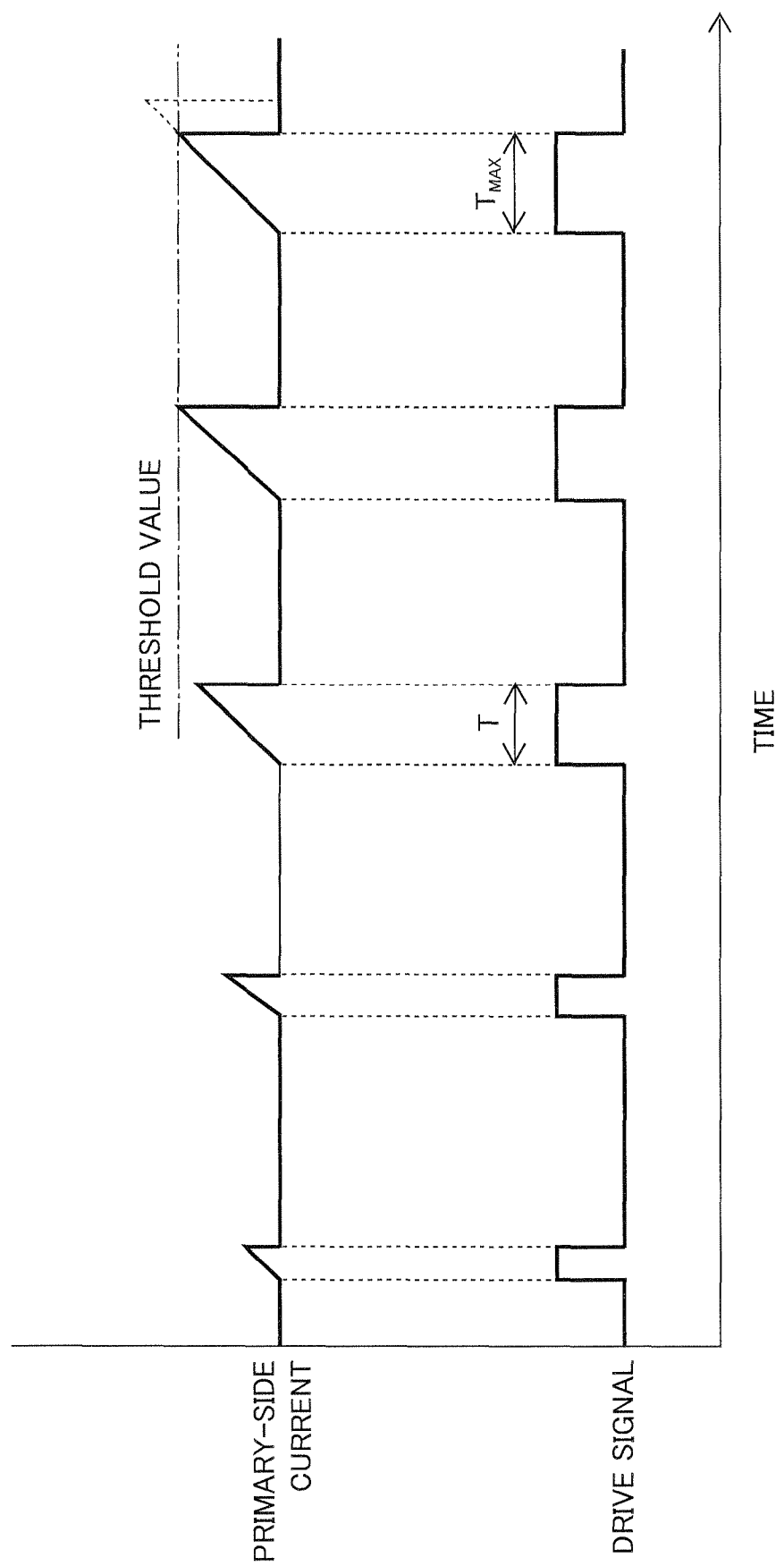
FIG. 12 is a waveform chart showing operation waveforms in the switching power supply circuit as shown in FIG. 8.

As shown by arrow (1) in FIG. 11, when the secondary-side current increases and the primary-side current reaches the threshold value, and further, the primary-side current exceeds the threshold value, the DSP 111 maintains the pulse width in the drive signal constant and stops the constant voltage stabilizing operation (step S13). FIG. 12 shows waveforms at that time. The pulse width T of the drive signal increases until the primary-side current exceeds the threshold value, and the pulse width T is limited to the maximum value $T_{MAX}$ when the primary-side current exceeds the threshold value.

After that, the secondary-side voltage is not constant and the secondary-side voltage gradually decreases as shown by arrow (2) in FIG. 11 as the secondary-side current increases due to the impedance condition of the load circuit (e.g., a solenoid in an impact printer). Even when the secondary-side voltage decreases, if the secondary-side voltage is higher than the threshold value and the secondary-side current is maintained, it may be considered that the switching power supply circuit is within the allowable operation range. Since the solenoid for driving a print head in the impact printer is driven by current, it can operate when the power supply voltage decreases to some degree. Therefore, using the switching power supply circuit having the above-mentioned output current to output voltage characteristic like a polygonal line, the printing operation can be continued even when the output voltage of the switching power supply circuit decreases to some degree.

At step S14, the DSP 111 judges whether or not the number of times when the primary-side current exceeds the threshold value in a predetermined period is within an allowable range. If the number of times when the primary-side current exceeds the threshold value in the predetermined period is within the allowable range, the processing moves to step S15, and, if the number of times when the primary-side current exceeds the threshold value in the predetermined period is over the allowable range, the processing moves to step S16.

At step S15, the DSP 111 judges whether or not the secondary-side voltage is below the threshold value. If the secondary-side voltage is not below the threshold value, the processing moves to step S12, and, if the secondary-side voltage is below the threshold value, the processing moves to step S16.

At step S16, the DSP 111 stops the switching operation of the MOSFET 31 by deactivating the drive signal and cuts off the current flowing through the primary-side wiring because the MOSFET 31 is possibly broken due to the current stress.

Alternatively, step S14 may be omitted and, when the primary-side current exceeds the threshold value, the pulse width T of the drive signal may be continuously maintained at the maximum value $T_{MAX}$ until the secondary-side voltage decreases below the threshold value.

In this regard, the setting information on the threshold value of the primary-side current, the setting information on the threshold value of the secondary-side voltage, the setting information on the allowable range in the case where the primary-side current exceeds the threshold value, and so on are stored in the data table in the storage unit 112.

Further, the storage unit 112 may store setting information for waiting mode including the primary-side current to secondary-side voltage characteristic and so on when the load device (e.g., an impact printer or the like) is in the waiting mode in addition to the setting information for normal operation mode. In this case, the DSP 111 changes the output characteristic in the waiting mode according to a mode signal representing whether the load device is in the normal operation mode or the waiting mode (see the dashed-dotted line in FIG. 11). Thereby, the power consumption in the waiting mode can be reduced.

Furthermore, the storage unit 112 may store setting information for harsh use environment including the primary-side current to secondary-side voltage characteristics and so on in harsh use environments (e.g., the use location is at the high temperature or the like) in addition to the setting information for the normal use environment in the data table. For example, plural kinds of setting information corresponding to plural kinds of temperature ranges are stored in the data table in the storage unit 112. In this case, the DSP 111 changes the output characteristic depending on the temperature range represented by the temperature data outputted from the temperature sensor 120 (see the dashed-two dotted line in FIG. 11). Thereby, the failure of the switching element in harsh use environments can be prevented.

Alternatively, the storage unit 112 may store plural kinds of setting information corresponding to plural kinds of AC input voltages (e.g., 100V, 115V, 120V, and so on) in the data table. In this case, the DSP 111 selects one kind of setting information from the plural kinds of setting information according to the detection value of input voltage or a signal representing an externally supplied input voltage. Thereby, output characteristics suitable for AC input voltages can be obtained.

In the case where the load device is an impact printer, the storage unit 112 may store plural kinds of setting information corresponding to plural kinds of print languages (e.g., Japanese, English, and so on) or impact printer models in the data table. In this case, the DSP 111 selects one kind of setting information from the plural kinds of setting information according to a signal representing the print language or the impact printer model. Since the load characteristics vary depending on print language or models, output characteristics suitable for the print language or the impact printer model can be obtained.

Next, the fourth embodiment of the present invention will be explained.

Figure 13:
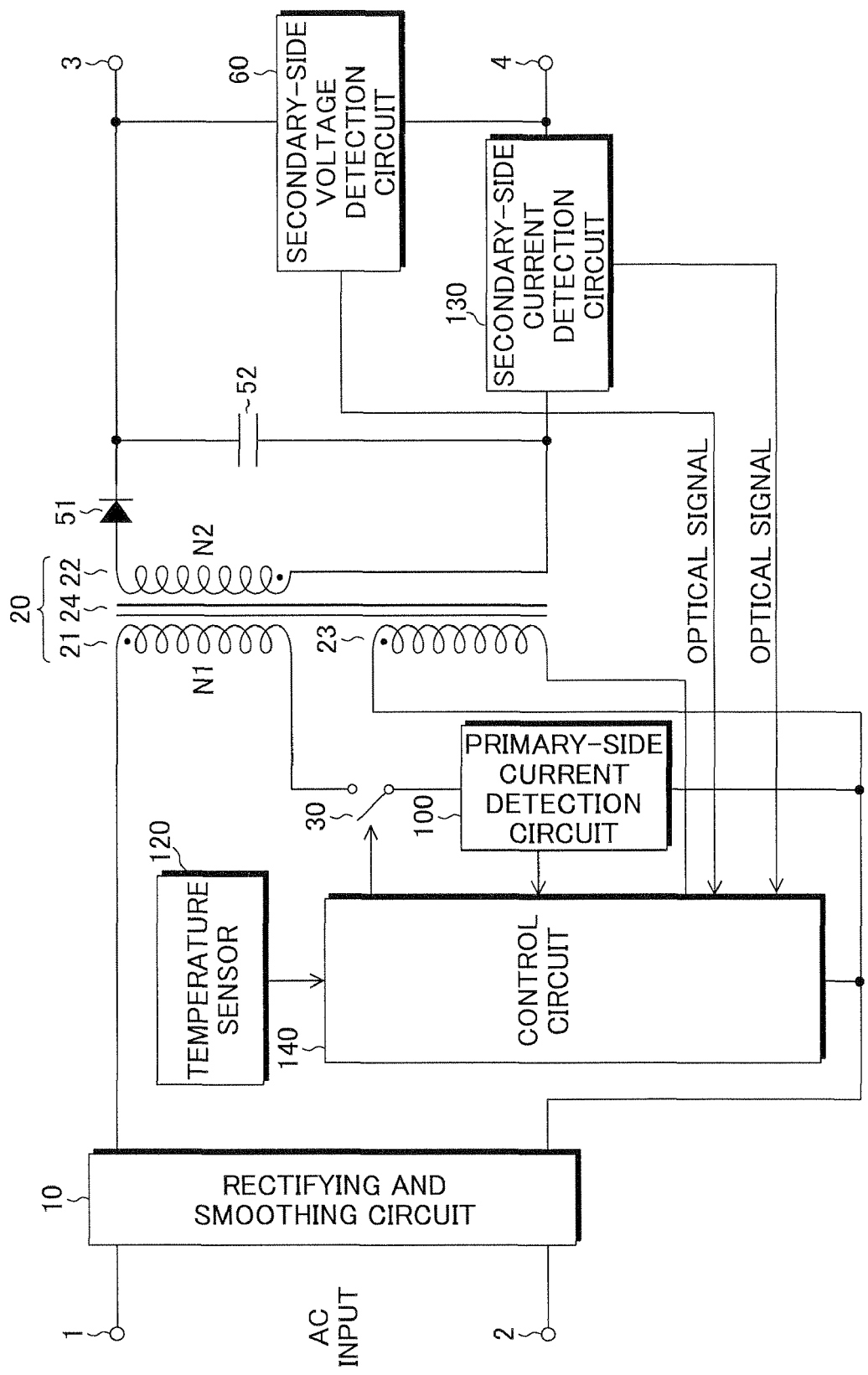
FIG. 13 shows a configuration of a switching power supply circuit according to the fourth embodiment of the present invention.

FIG. 13 shows a configuration of a switching power supply circuit according to the fourth embodiment of the present invention. This switching power supply circuit differs from the switching power supply circuit according to the third embodiment as shown in FIG. 8 in that a secondary-side current detection circuit 130 for detecting the secondary-side current is inserted between the capacitor 52 and the output terminal 4 and the control circuit 100 is changed to a control circuit 140.

Figure 14:
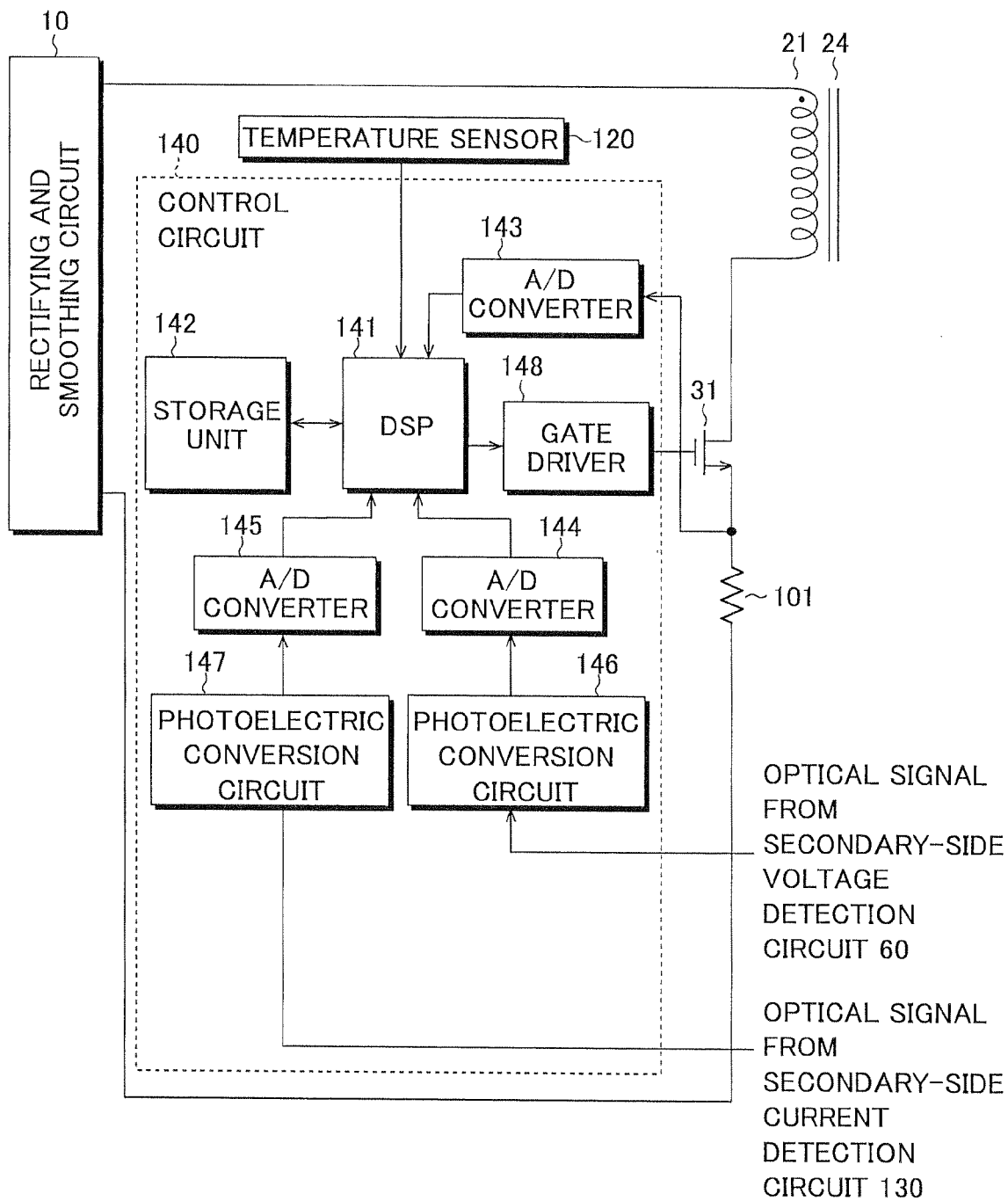
FIG. 14 specifically shows a configuration of a control circuit and so on as shown in FIG. 13.

FIG. 14 specifically shows the configuration of the control circuit and so on as shown in FIG. 13. The control circuit 140 has a DSP (digital signal processor) 141 integrally including a control block for generating a drive signal, a storage unit 142 such as a nonvolatile memory for storing software (control programs) and data, A/D converters 143-145, photoelectric conversion circuits 146 and 147, and a gate driver 148. The storage unit 142 stores a data table and the data table includes various kinds of setting information to be used for controlling the operation of the switching power supply circuit.

The A/D converter 143 converts the primary-side current detection signal as an analog signal obtained by the resistor 101 into a digital signal and outputs it to the DSP 141. The photoelectric conversion circuit 146 converts an optical signal from the secondary-side voltage detection circuit 60 into an electric signal and outputs it to the A/D converter 144. The A/D converter 144 converts the secondary-side voltage detection signal as an analog signal obtained by the photoelectric conversion circuit 146 into a digital signal and outputs it to the DSP 141. The photoelectric conversion circuit 147 converts an optical signal from the secondary-side current detection circuit 130 into an electric signal and outputs it to the A/D converter 145. The A/D converter 145 converts the secondary-side current detection signal as an analog signal obtained by the photoelectric conversion circuit 147 into a digital signal and outputs it to the DSP 141.

The DSP 141 performs pulse width modulation (PWM) based on at least the detection signal outputted from the primary-side current detection circuit 100, the secondary-side voltage detection circuit 60, and the secondary-side current detection circuit 130, and generates a drive signal (PWM signal). In addition, the DSP 141 may generate the drive signal by performing pulse width modulation based on temperature data outputted to the temperature sensor 120. The drive signal is applied to the gate of the MOSFET 31 by the gate driver 148.

Figure 15:
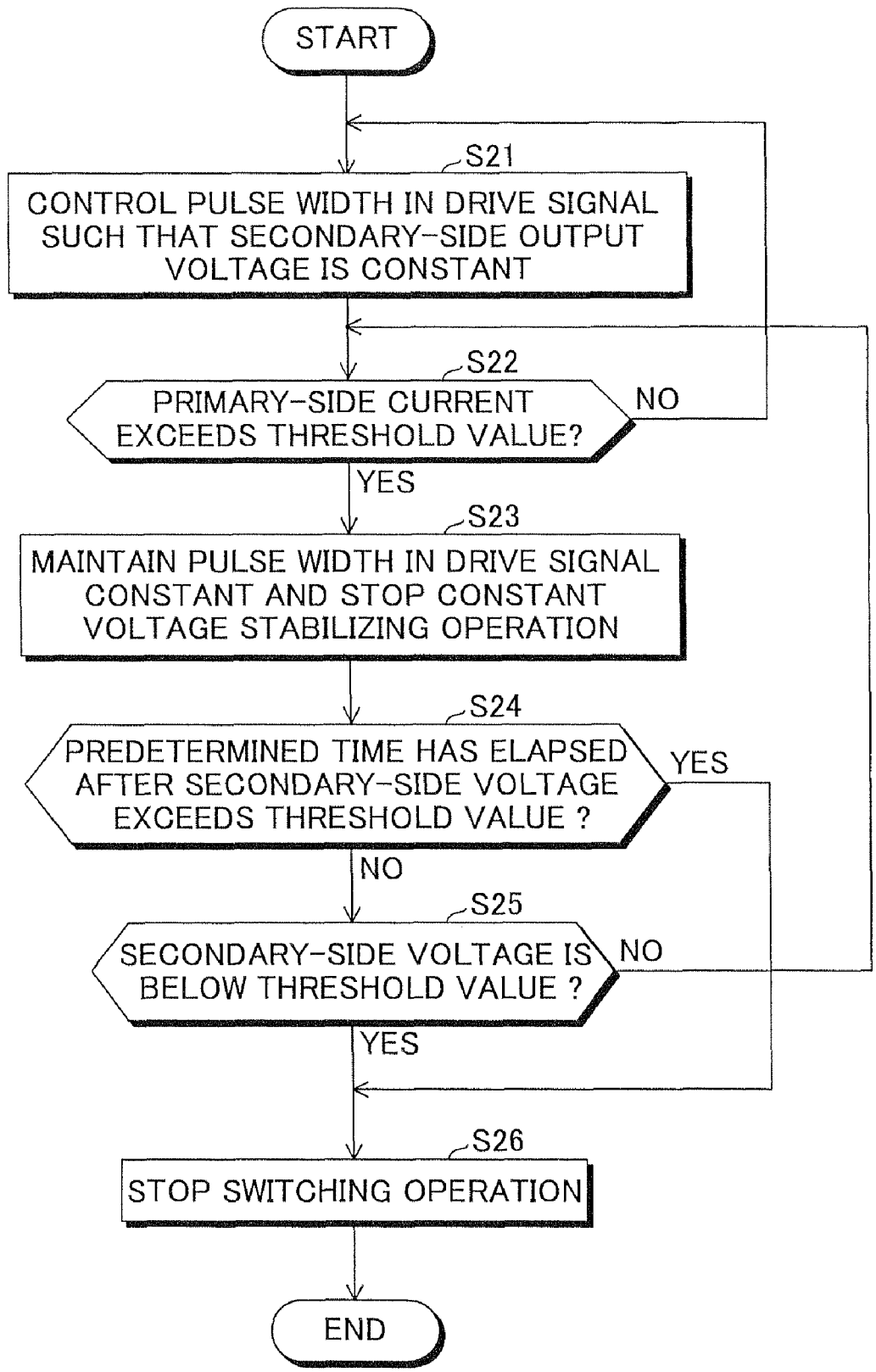
FIG. 15 is a flowchart showing a control operation of a DSP as shown in FIG. 14.

Next, an operation of the switching power supply circuit as shown in FIG. 13 will be explained with reference to FIGS. 13-16. FIG. 15 is a flowchart showing a control operation of the DSP as shown in FIG. 14, and FIG. 16 shows output current to output voltage characteristics (secondary-side current to secondary-side voltage characteristics) of the switching power supply circuit as shown in FIG. 13.

Referring to FIG. 15, first, at step S21, the DSP 141 controls the pulse width in the drive signal so as to perform a constant voltage stabilizing operation by which the secondary-side voltage represented by the output value of the A/D converter 144 is constant. Further, at step S22, the DSP 141 judges whether or not the primary-side current represented by the output value of the A/D converter 143 exceeds a threshold value and controls the pulse width in the drive signal so as to perform the constant voltage stabilizing operation before the primary-side current exceeds the threshold value.

Figure 16:
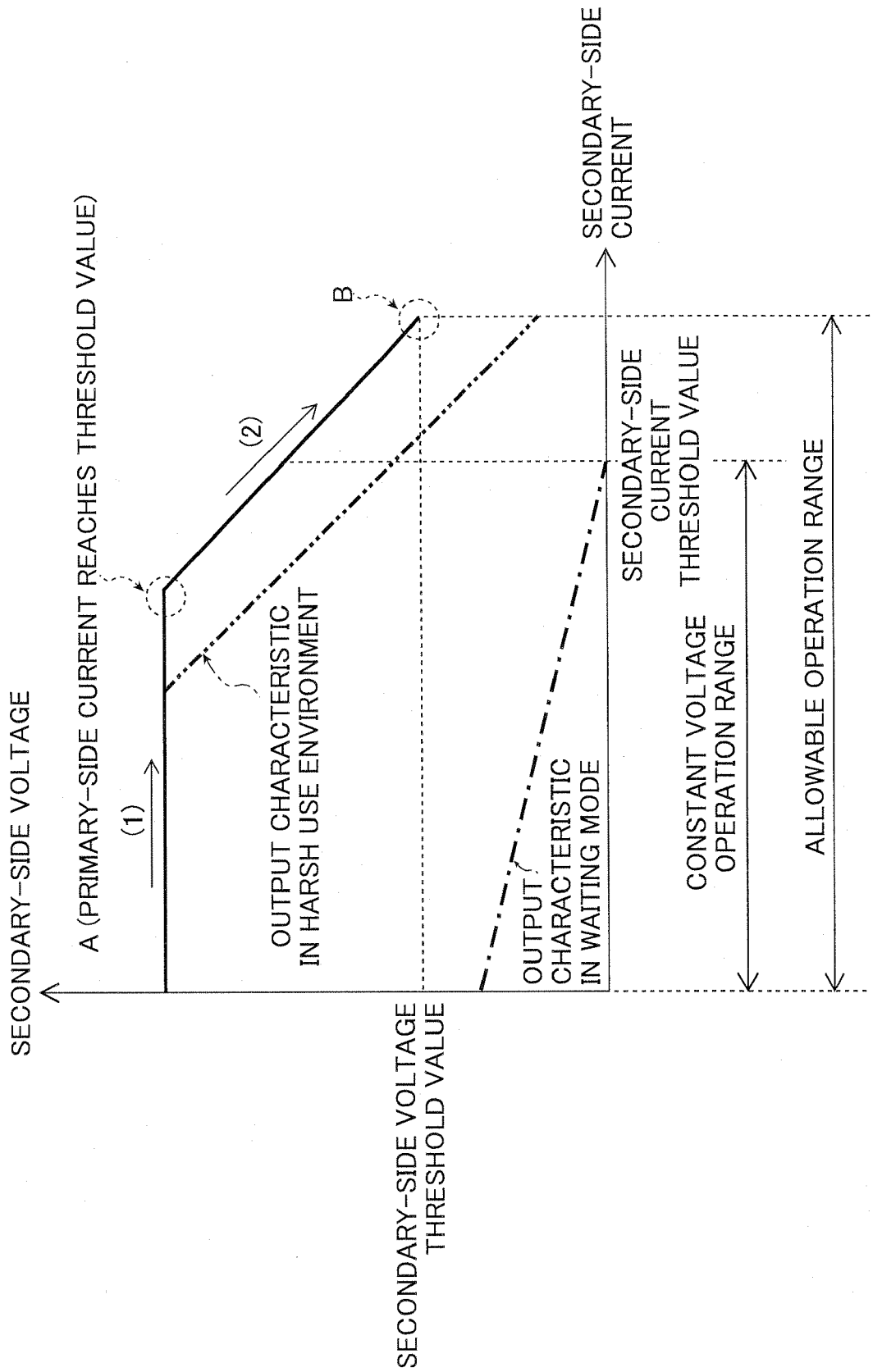
FIG. 16 shows output current to output voltage characteristics (secondary-side current to secondary-side voltage characteristics) of the switching power supply circuit as shown in FIG. 13.

As shown by arrow (1) in FIG. 16, when the secondary-side current increases and the primary-side current reaches the threshold value, and further, the primary-side current exceeds the threshold value, the DSP 141 maintains the pulse width in the drive signal constant and stops the constant voltage stabilizing operation (step S23).

After that, the secondary-side voltage is not constant and the secondary-side voltage gradually decreases as shown by arrow (2) in FIG. 16 as the secondary-side current increases due to the impedance condition of the load circuit (e.g., a solenoid in an impact printer). Even when the secondary-side voltage decreases, if the secondary-side current does not exceed the threshold value and the secondary-side voltage is not below the threshold value, the secondary-side current is maintained and it may be considered that the switching power supply circuit is within the allowable operation range.

At step S24, the DSP 141 judges whether or not a predetermined time has elapsed after the secondary-side current exceeds the threshold value. If the predetermined time has not elapsed after the secondary-side current exceeds the threshold value, the processing moves to step S25, and, if the predetermined time has elapsed after the secondary-side current exceeds the threshold value, the processing moves to step S26.

At step S25, the DSP 141 judges whether or not the secondary-side voltage is below the threshold value. If the secondary-side voltage is not below the threshold value, the processing moves to step S22, and, if the secondary-side voltage is below the threshold value, the processing moves to step S26.

At step S26, the DSP 141 stops the switching operation of the MOSFET 31 by deactivating the drive signal and cuts off the current flowing through the primary-side wiring because the MOSFET 31 is possibly broken due to the current stress.

In this regard, the setting information on the threshold value of the primary-side current, the setting information on the threshold value of the secondary-side voltage, the setting information on the allowable range in the case where the primary-side current exceeds the threshold value, and so on are stored in the data table in the storage unit 142.

In the fourth embodiment, the case where the secondary-side current detection circuit 130 is connected to the secondary-side wiring 22 of the transformer has been explained, however, the present invention is not limited to that, but the secondary-side current detection circuit 130 may be connected to the auxiliary wiring 23 of the transformer. In this case, the secondary-side current can be detected in isolation from the load side.

In the above-mentioned first to fourth embodiments, the flyback switching power supply has been explained as an example, however, the present invention is not limited to the flyback switching power supply, but applicable to various types of switching power supplies using transformers such as forward types or various kinds of bridge types, for example.

Next, the fifth embodiment of the present invention will be explained. In the following embodiments, the present invention is applied to a chopper type switching power supply circuit using a choke coil in place of a transformer. In the chopper type switching power supply circuit, although the input side and the output side are non-insulated because no transformer is used, the circuit can be downsized.

Figure 17:
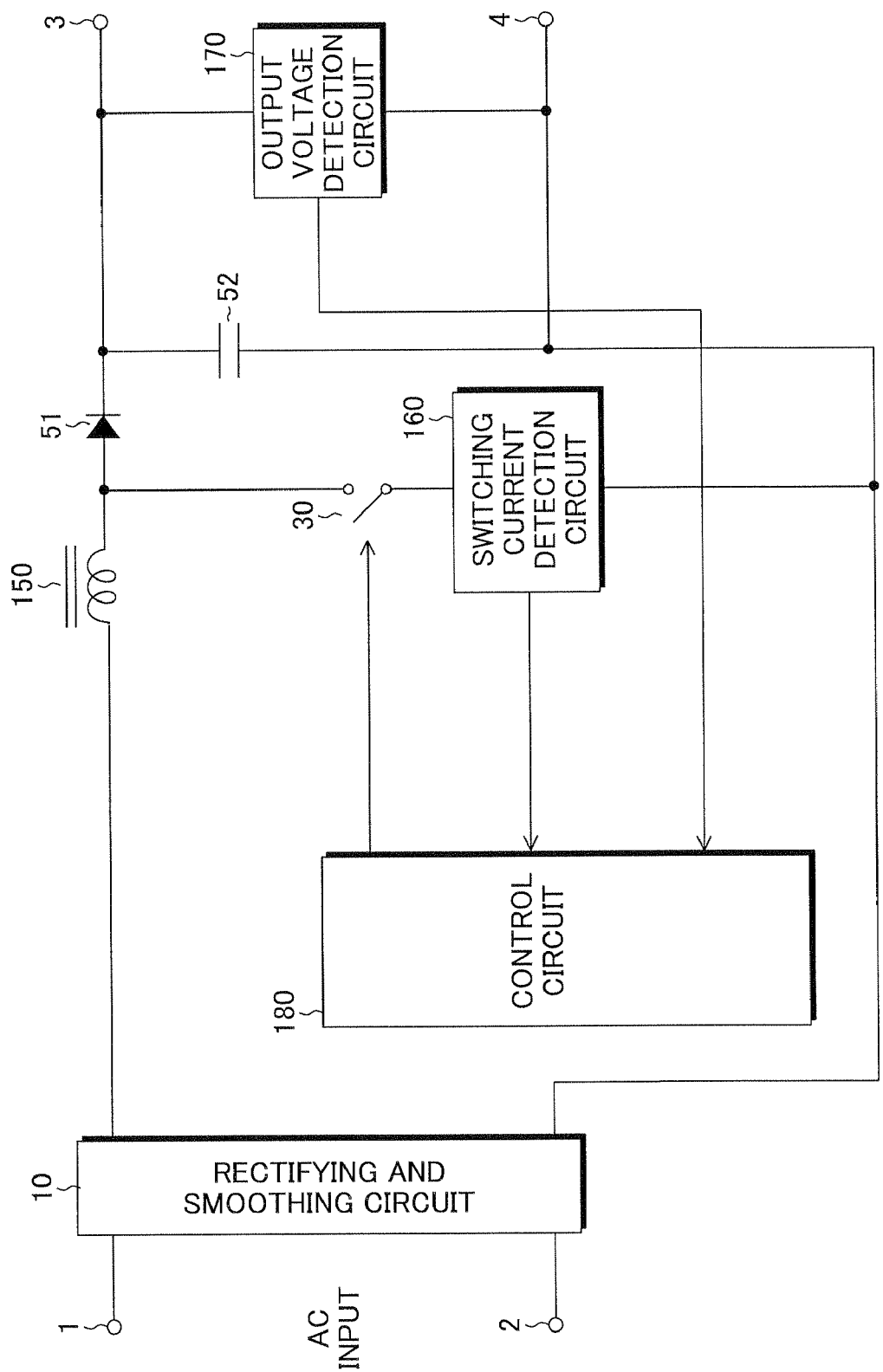
FIG. 17 shows a configuration of a switching power supply circuit according to the fifth embodiment of the present invention.

FIG. 17 shows a configuration of a switching power supply circuit according to the fifth embodiment of the present invention. In the fifth embodiment, a chopper step-up switching power supply circuit will be explained as an example. The switching power supply circuit has a rectifying and smoothing circuit 10 connected to input terminals 1 and 2 for an alternating-current power supply voltage, a choke coil 150 having one terminal connected to the rectifying and smoothing circuit 10, for accumulating magnetic energy generated by current flowing through the winding in a core, a switching element 30 connected to the other terminal of the choke coil 150, for flowing current through the choke coil 150 according to a pulsive drive signal, and a switching current detection circuit 160 for detecting the current flowing through the switching element 30. Here, in the case where a primary-side winding of a transformer is used as the choke coil 150, a secondary-side winding of the transformer may be utilized for generating internal power supply.

Furthermore, the switching power supply circuit has a diode 51 for half-wave rectifying a voltage generated at the other terminal of the choke coil 150, a capacitor 52 for generating an output voltage by smoothing the rectified voltage and supplying the voltage to output terminals 3 and 4, an output voltage detection circuit 170 for detecting the output voltage between the output terminals 3 and 4, and a control circuit 180 for generating a drive signal.

The rectifying and smoothing circuit 10 includes a diode bridge and a capacitor, for example, and full-wave rectifies the alternating-current voltage applied between the input terminal 1 and the input terminal 2 with the diode bridge and smoothes the voltage with the capacitor.

The choke coil 150 accumulates energy in the core when the switching element 30 is turned on. Then, when the switching element 30 is turned off, the magnetic field tends to maintain the current, and thus, the current of the choke coil 150 flows to the capacitor 52 via the diode 51. The capacitor 52 is charged and a direct-current output voltage is generated between the output terminal 3 and the output terminal 4.

In the present invention, a magnetic material of amorphous metal having high saturation magnetic flux density is used for the core of the choke coil 150. As a specific material, for example, an amorphous alloy Fe—Co (60-80 wt %) containing iron (Fe) and cobalt (Co) may be used. As types of core, a bulk type molded by sintering a powder material and a laminate type formed by laminating ribbon-shaped cores may be used.

The magnetic material of amorphous metal has advantages that its saturation magnetic flux density is higher than that of ferrite, molding is easier when an E-shaped core is molded, its magnetic characteristic varies less depending on the temperature, its hysteresis loss and eddy current loss is smaller and its high-frequency characteristic is better. Further, when the magnetic material of amorphous metal is used for the core of the choke coil, the core is hard to be magnetically saturated and the amount of heat generation is small, and thus, the power twice or more the power in the case of using ferrite can be supplied. Since there is no need to form a gap in the core, the leakage of magnetic flux from the gap is not problematic.

Note that, when the magnetic material of amorphous metal is used, the inductance per number of turns (also referred to as "AL value") is smaller than that in the case of using ferrite. Accordingly, the inductance of the winding is smaller even if the number of turns is increased to some degree and the current flowing in the winding increases. Further, since the magnetic material of amorphous metal is hard to be saturated, the peak current flowing in the winding can be increased. However, as the peak current becomes larger, the problem that the switching element becomes easier to be broken arises. On this account, the switching element is protected by improvement of the circuit in the embodiment.

Figure 18:
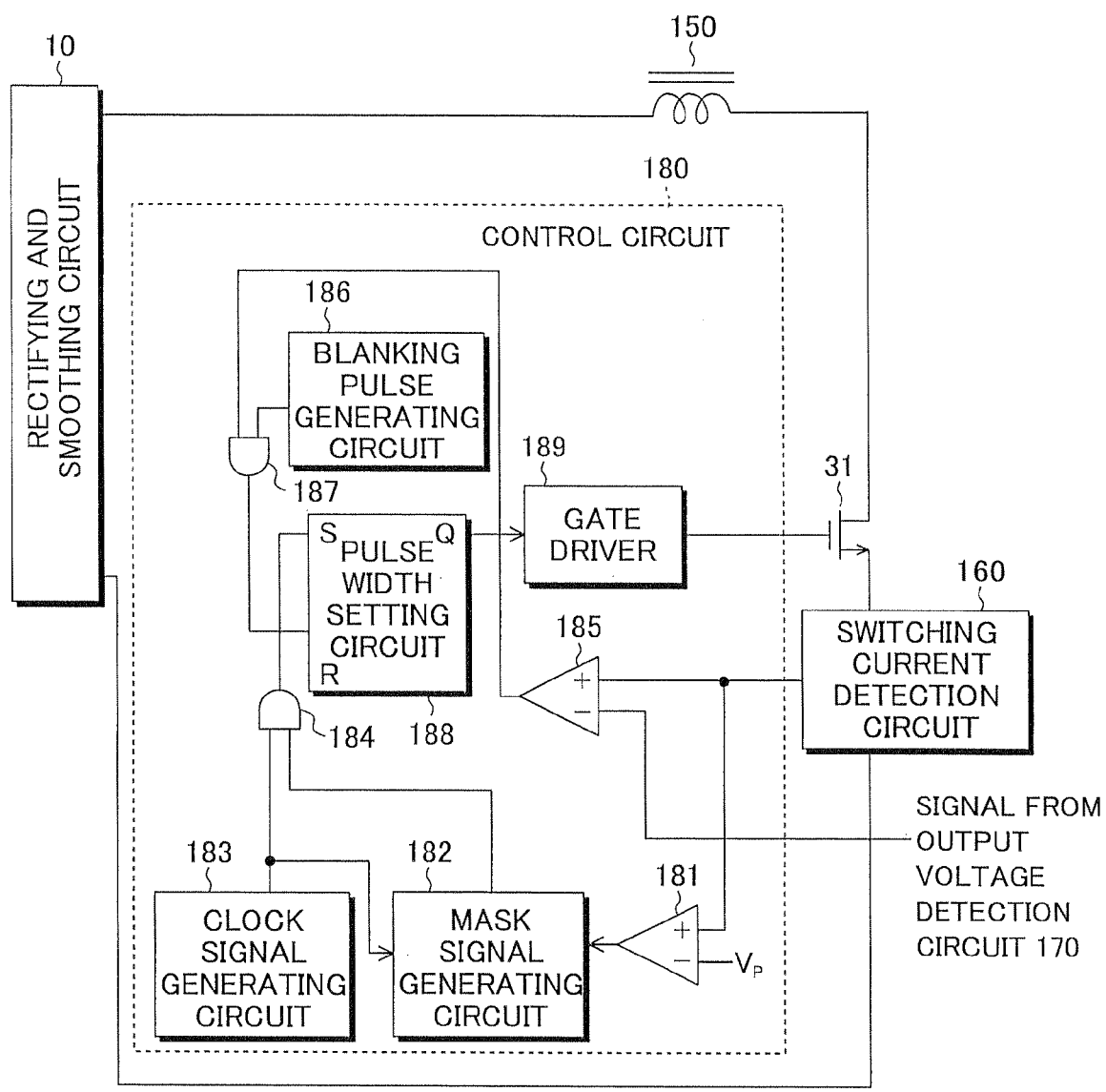
FIG. 18 specifically shows a configuration of a control circuit and so on as shown in FIG. 17.

FIG. 18 specifically shows the configuration of the control circuit and so on as shown in FIG. 17. In the embodiment, an N-channel MOSFET 31 is used as the switching element 30 as shown in FIG. 17. The MOSFET 31 has a drain connected to the other terminal of the choke coil 150, a source connected to the rectifying and smoothing circuit 10 via the switching current detection circuit 160, and a gate to which a drive signal is applied from a gate driver 189.

The choke coil 150, the drain-source path of the MOSFET 31, and the switching current detection circuit 160 are series-connected, and the voltage obtained by rectifying and smoothing the alternating-current power supply voltage in the rectifying and smoothing circuit 10 is supplied to the series circuit. The MOSFET 31 flows current through the choke coil 150 according to the pulsive drive signal applied to the gate.

The control circuit 180 includes a comparator 181, a mask signal generating circuit 182, a clock signal generating circuit 183, an AND circuit 184, a comparator 185, a blanking pulse generating circuit 186, an AND circuit 187, a pulse width setting circuit 188, and a gate driver 189.

The clock signal generating circuit 183 generates a clock signal. The AND circuit 184 obtains logical multiplication of the clock signal outputted from the clock signal generating circuit 183 and the mask signal outputted from the mask signal generating circuit 182. When the mask signal is fixed at the high level, the clock signal is constantly supplied to the set terminal S of the pulse width setting circuit 188.

Further, a detection voltage outputted from the switching current detection circuit 160 is inputted to a non-inverting input terminal of the comparator 185, and a detection voltage outputted from the output voltage detection circuit 170 as shown in FIG. 17 is inputted to an inverting input terminal of the comparator 185. In the output voltage detection circuit 170, when the load of the switching power supply circuit is light, the detection voltage falls as the output voltage of the switching power supply circuit rises, and, when the switching power supply circuit is highly loaded, the detection voltage rises as the output voltage of the switching power supply circuit falls. Furthermore, the upper limit is set by a limiter circuit for the detection voltage outputted from the output voltage detection circuit 170.

The comparator 185 compares the detection voltage outputted from the switching current detection circuit 160 with the detection voltage outputted from the output voltage detection circuit 170 to output a comparison signal representing a comparison result. Further, the blanking pulse generating circuit 186 generates a blanking pulse signal which becomes at the high level in a predetermined period in synchronization with the clock signal for preventing the false operation that the MOSFET 31 is turned off while the primary-side current of the transformer is still small. The AND circuit 187 obtains logical multiplication of the comparison signal outputted from the comparator 185 and the blanking pulse signal outputted from the blanking pulse generating circuit 186. In the period in which the blanking pulse signal is at the high level, the comparison signal generated by the comparator 185 is outputted from the AND circuit 187.

The pulse width setting circuit 188 is configured by an RS flip-flop having a set terminal S, a reset terminal R, and an output terminal Q, for example. The pulse width setting circuit 188 sets an output signal in synchronization with the clock signal generated by the clock signal generating circuit 183, resets the output signal in synchronization with the comparison signal generated by the comparator 185 when the blanking pulse signal is at the high level, and thereby, sets up the pulse width in the drive signal. The gate driver 189 drives the gate of the MOSFET 31 according to the drive signal outputted from the pulse width setting circuit 188.

Since the operation of the control circuit as shown in FIG. 18 is generally the same as those shown in FIGS. 4 and 5, the operation of the control circuit 180 will be specifically explained with reference to FIG. 4.

The output signal of the pulse width setting circuit 188 is set in synchronization with the rising edge of the clock signal $V_{CK}$ generated by the clock signal generating circuit 183, and the gate voltage $V_G$ as shown in FIG. 4 (*e*) reaches the high level.

The comparison signal outputted from the comparator 185 is obtained by the comparison between the first detection voltage outputted from the switching current detection circuit 160 and the second detection voltage outputted from the output voltage detection circuit 170. In the overload condition, the drain current $I_D$ of the MOSFET 31 increases and the first detection voltage increases, and the output voltage at the secondary side of the transformer decreases and the second detection voltage also increases. The upper limit is provided to the second detection voltage in the output voltage detection circuit 170. Accordingly, when the second detection voltage reaches the upper limit, if the first detection voltage exceeds the upper limit, the comparison signal outputted from the comparator 185 reaches the high level. Consequently, the output signal of the pulse width setting circuit 188 is reset, the gate voltage $V_G$ reaches the low level, and the drain current $I_D$ stops at point A as shown in FIG. 4 (*b*).

In this manner, the control circuit 180 turns on the MOSFET 31 in a fixed cycle and turns off the MOSFET 31 in synchronization with the rising edge of the comparison signal. In FIG. 4 (*e*), the period in which the MOSFET 31 is turned on is represented by $T_{ON}$ and the period in which the MOSFET 31 is turned off is represented by $T_{OFF}$.

Then, the case where the control circuit 180 judges whether or not the current flowing in the MOSFET 31 exceeds the rated current and controls the drive signal to be applied to the gate of the MOSFET 31 will be explained. The rated current refers to the magnitude of the drain current that the MOSFET can stably perform the steady operation, and determined in advance based on the AC input voltage of the switching power supply circuit, the MOSFET standard, or the like.

The comparator 181 compares the magnitude of the switching current detected by the switching current detection circuit 160 with a preset voltage $V_P$ set according to the rated current, and outputs a comparison signal representing the comparison result. The mask signal generating circuit 182 determines the operation mode of the MOSFET 31 based on the comparison signal outputted from the comparator 181, and generates a mask signal adaptable to the operation mode.

The pulse width setting circuit 188 sets the output signal in synchronization with the clock signal generated by the clock signal generating circuit 183 when the mask signal is at the high level and resets the output signal in synchronization with the comparison signal generated by the comparator 185 when the blanking pulse signal is at the high level, and thereby, sets up the pulse width in the drive signal.

The operation of the switching power supply circuit according to the embodiment is the same as that shown in FIG. 7. As shown in FIG. 7, In the period $T_0$, the drain current $I_D$ of the MOSFET 31 does not exceed the rated current, and thus, the comparison signal outputted from the comparator 181 is maintained at the low level. Based on the signal, the mask signal generating circuit 182 determines the operation mode of the MOSFET 31 as the normal load mode, and fixes the mask signal at the high level. Therefore, the clock signal outputted from the clock signal generating circuit 183 is supplied to the pulse width setting circuit 188 via the AND circuit 184. Consequently, the plural pulses continuous in synchronization with the clock signal are applied to the gate of the MOSFET 31.

In the period $T_1$, when the switching power supply circuit is in the overload condition and the drain current $I_D$ of the MOSFET 31 periodically exceeds the rated current, the comparison signal outputted from the comparator 181 periodically reaches the high level in synchronization with the clock signal. Based on the comparison signal, the mask signal generating circuit 182 determines the operation mode of the MOSFET 31 as the overload mode, and limits the period in which the mask signal is at the high level for protecting the MOSFET 31 such that the MOSFET 31 performs the intermittent operation.

For example, the mask signal generating circuit 182 increments the count value in synchronization with the rising edge of the comparison signal outputted from the comparator 181, sets the mask signal at the high level in the first period $T_1$ until the count value becomes a predetermined value, and sets the mask signal at the low level in the subsequent second period $T_2$. As long as the overload condition continues, the first period $T_1$ and the second period $T_2$ are repeated.

Consequently, in the first period $T_1$, the plural pulses continuous in synchronization with the clock signal are applied to the gate of the MOSFET 31, and, in the second period $T_2$, no pulse is applied to the gate of the MOSFET 31. In this manner, the upper limit of the period in which plural pulses continue in synchronization with the clock signal is set in the drive signal, and therefore, the upper limit of the period, in which the MOSFET 31 flows current through the primary-side winding 21 of the transformer, is set. In the first period $T_1$, when the comparison signal reaches the low level in the next cycle to the cycle when the comparison signal reaches the high level, the mask signal generating circuit 182 changes the operation mode of the MOSFET 31 from the overload mode to the normal load mode.

When the load of the switching power supply circuit becomes heavier and very large drain current $I_D$ flows, the upper limit of the pulse width in the drive signal is set as explained above. That is, by setting the upper limit for the detection voltage in the output voltage detection circuit 170, as shown in FIG. 7, the upper limit of the pulse width in the drive signal is set to a period $T_3$, and the drain current $I_D$ of the MOSFET 31 is suppressed equal to or less than the maximum current (point A).

In the fifth embodiment, the drive signal may be generated based on the detection result of the switching current detection circuit 160 by applying a predetermined voltage in place of the detection voltage outputted from the output voltage detection circuit 170 to the inverting input terminal of the comparator 185. Also in this case, when the detection voltage outputted from the switching current detection circuit 160 exceeds a predetermined voltage, the output signal of the pulse width setting circuit 188 is reset, and thereby, the upper limit of the pulse width in the drive signal can be set.

Next, the sixth embodiment of the present invention will be explained.

Figure 19:
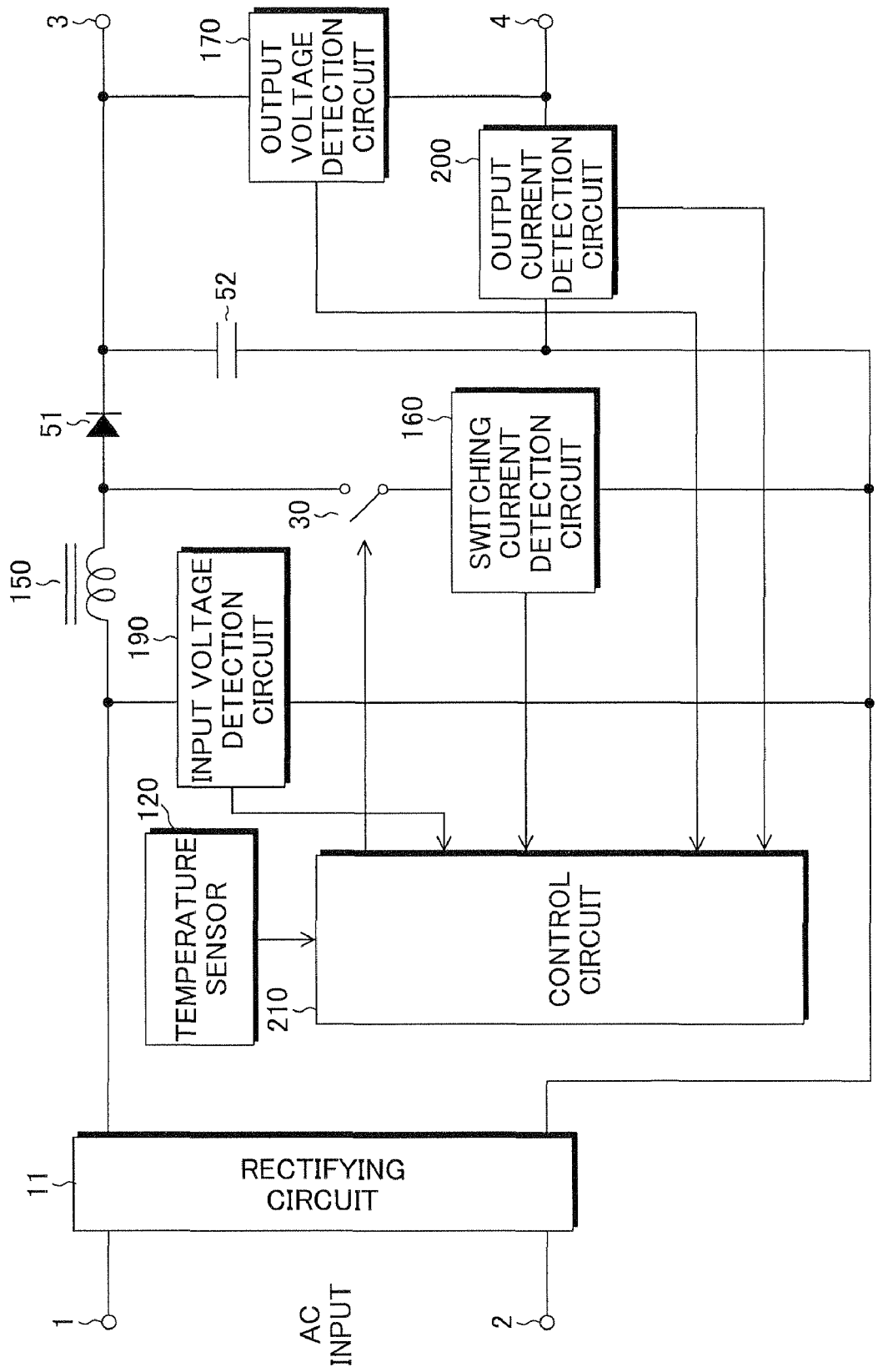
FIG. 19 shows a configuration of a switching power supply circuit according to the sixth embodiment of the present invention.

FIG. 19 shows a configuration of a switching power supply circuit according to the sixth embodiment of the present invention. In the sixth embodiment, a PFC (power factor controller) circuit will be explained as an example. The PFC circuit refers to a circuit that improves, when converting a voltage obtained by rectifying an alternating-current voltage into an alternating-current voltage by switching and converting the obtained alternating-current voltage into a direct-current voltage again, the power factor by matching waveforms and phases in voltage and current.

The switching power supply circuit has a rectifying circuit 11 connected to input terminals 1 and 2 for an alternating-current power supply voltage, an input voltage detection circuit 190 for detecting a voltage inputted from the rectifying circuit 11, a choke coil 150 having one terminal connected to the rectifying circuit 11, for accumulating magnetic energy generated by current flowing through the winding in a core, a switching element 30 connected to the other terminal of the choke coil 150, for flowing current through the choke coil 150 according to a pulsive drive signal, and a switching current detection circuit 160 for detecting the current flowing through the switching element 30. Here, in the case where a primary-side winding of a transformer is used as the choke coil 150, a secondary-side winding of the transformer may be utilized for generating internal power supply.

Furthermore, the switching power supply circuit has a diode 51 for half-wave rectifying a voltage generated at the other terminal of the choke coil 150, a capacitor 52 for generating an output voltage by smoothing the rectified voltage and supplying the voltage to output terminals 3 and 4, an output voltage detection circuit 170 for detecting the output voltage between the output terminals 3 and 4, an output current detection circuit 200 inserted between the capacitor 52 and the output terminal 4, for detecting the output current, a control circuit 210 for setting a pulse width of a drive signal, and a temperature sensor 120 for sensing the ambient temperature of the heat generating switching element 30.

The rectifying circuit 11 is configured by a diode bridge, for example, and full-wave rectifies the alternating-current voltage applied between the input terminal 1 and the input terminal 2. The choke coil 150 accumulates energy in the core when the switching element is turned on. Then, when the switching element 30 is turned off, the magnetic field tends to maintain the current, and thus, the current of the choke coil 150 flows to the capacitor 52 via the diode 51. The capacitor 52 is charged and a direct-current output voltage is generated between the output terminal 3 and the output terminal 4.

Figure 20:
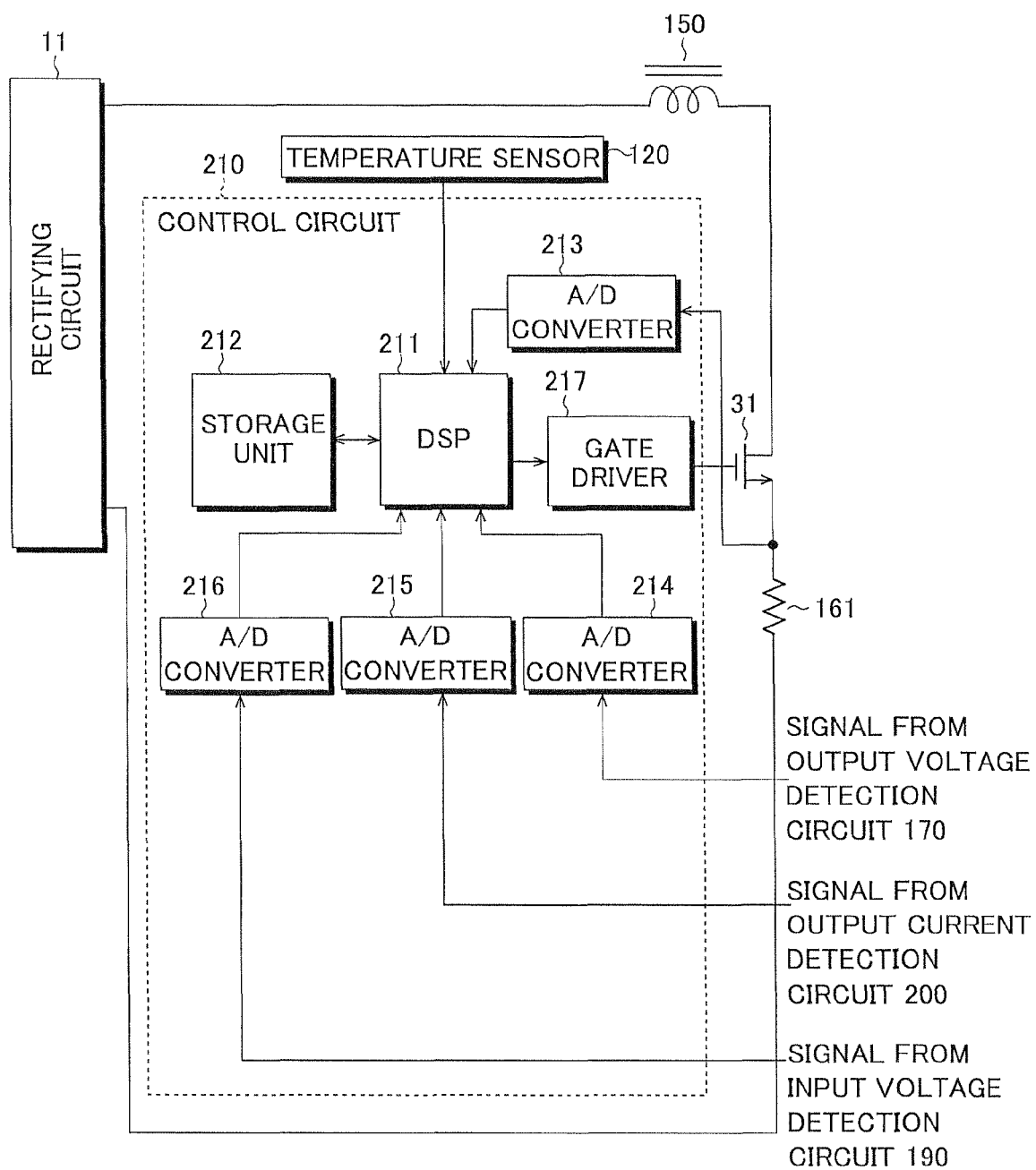
FIG. 20 specifically shows a configuration of a control circuit and so on as shown in FIG. 19.

FIG. 20 specifically shows the configuration of the control circuit and so on as shown in FIG. 19. In the embodiment, an N-channel MOSFET 31 is used as the switching element 30 as shown in FIG. 19, and a resistor 161 is used as the switching current detection circuit 160 as shown in FIG. 19. The MOSFET 31 has a drain connected to the other terminal of the choke coil 150, a source connected to the rectifying circuit 11 via the resistor 161, and a gate to which a drive signal is applied from a gate driver 217. The detection voltage proportional to the drain current of the MOSFET 31 can be obtained by measuring the voltage generated between both terminals of the resistor 161.

The choke coil 150, the drain-source path of the MOSFET 31, and the resistor 161 are series-connected, and the voltage obtained by rectifying the alternating-current power supply voltage in the rectifying circuit 11 is supplied to the series circuit. The MOSFET 31 flows current through the choke coil 150 according to the pulsive drive signal applied to the gate.

The control circuit 210 has a DSP (digital signal processor) 211 integrally including a control block for generating a drive signal, a storage unit 212 such as a nonvolatile memory for storing software (control programs) and data, A/D converters 213 and 216, and a gate driver 217. The storage unit 212 stores a data table and the data table includes various kinds of setting information to be used for controlling the operation of the switching power supply circuit.

The A/D converter 213 converts the switching current detection signal as an analog signal obtained by the resistor 161 into a digital signal and outputs it to the DSP 211. The A/D converter 214 converts the output voltage detection signal as an analog signal obtained by the output voltage detection circuit 170 into a digital signal and outputs it to the DSP 211. The A/D converter 215 converts the output current detection signal as an analog signal obtained by the output current detection circuit 200 into a digital signal and outputs it to the DSP 211. The A/D converter 216 converts the input voltage detection signal as an analog signal obtained by the input voltage detection circuit 190 into a digital signal and outputs it to the DSP 211.

The DSP 211 performs pulse width modulation (PWM) based on at least the detection signals outputted from the switching current detection circuit 160 and the output voltage detection circuit 170, and generates a drive signal (PWM signal). The DSP 211 may generate the drive signal by performing pulse width modulation based on the detection signals outputted from the output current detection circuit 200 and the input voltage detection circuit 190 and/or the temperature data outputted from the temperature sensor 120 in addition to the detection signals. The drive signal is applied to the gate of the MOSFET 31 by the gate driver 167.

Figure 21:
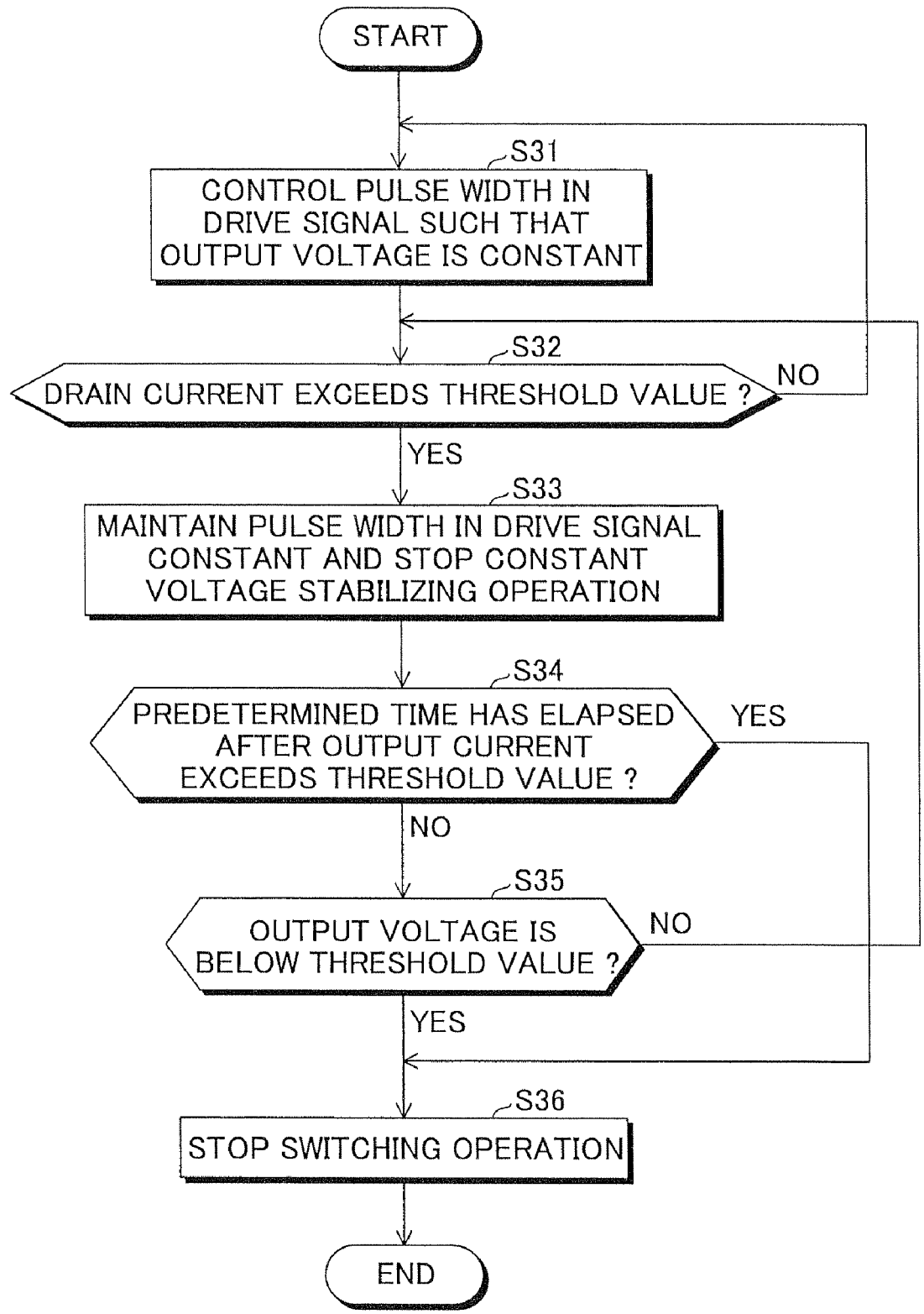
FIG. 21 is a flowchart showing a control operation of the DSP as shown in FIG. 20.

Next, an operation of the switching power supply circuit as shown in FIG. 19 will be explained with reference to FIGS. 19-22. FIG. 21 is a flowchart showing a control operation of the DSP as shown in FIG. 20, and FIG. 22 shows output current to output voltage characteristics of the switching power supply circuit as shown in FIG. 19.

Referring to FIG. 21, first, at step S31, the DSP 211 controls the pulse width in the drive signal so as to perform a constant voltage stabilizing operation by which the output voltage represented by the output value of the A/D converter 214 is constant. Further, at step S32, the DSP 211 judges whether or not the drain current represented by the output value of the A/D converter 213 exceeds a threshold value and controls the pulse width in the drive signal so as to perform the constant voltage stabilizing operation until the drain current exceeds the threshold value.

Figure 22:
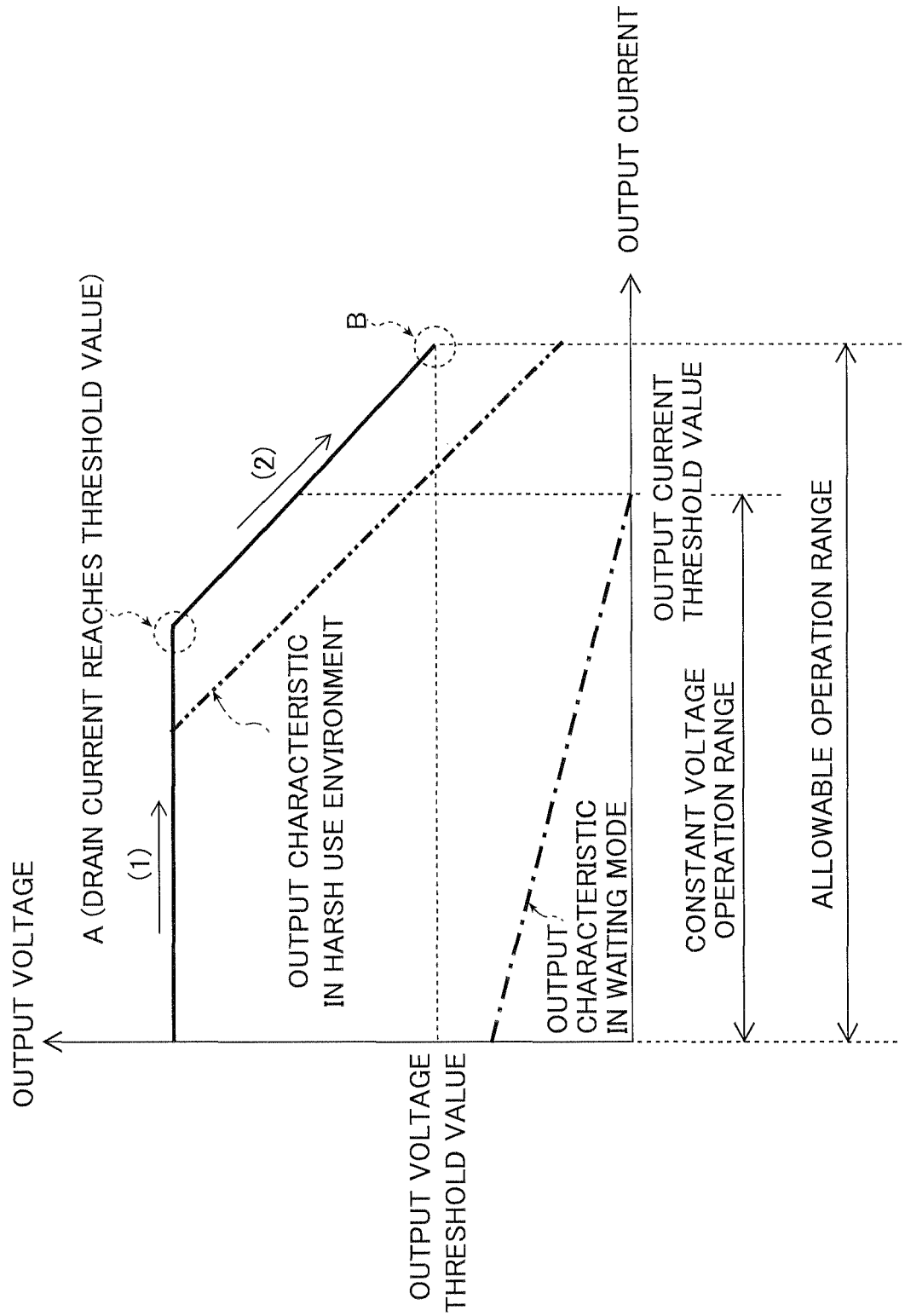
FIG. 22 shows output current to output voltage characteristics of the switching power supply circuit as shown in FIG. 19.

As shown by arrow (1) in FIG. 22, when the output current increases and the drain current reaches the threshold value, and further, the drain current exceeds the threshold value, the DSP 211 maintains the pulse width in the drive signal constant and stops the constant voltage stabilizing operation (step S33).

After that, the output voltage is not constant and the output voltage gradually decreases as shown by arrow (2) in FIG. 22 as the output current increases due to the impedance condition of the load circuit (e.g., a solenoid in an impact printer). Even when the output voltage decreases, if the output current does not exceed the threshold value and the output voltage is not below the threshold value, the secondary-side current is maintained and it may be considered that the switching power supply circuit is within the normal operation range.

At step S34, the DSP 211 judges whether or not a predetermined time has elapsed after the output current exceeds the threshold value. If the predetermined time has not elapsed after the output current exceeds the threshold value, the processing moves to step S35, and, if the predetermined time has elapsed after the output current exceeds the threshold value, the processing moves to step S36.

At step S35, the DSP 211 judges whether or not the output voltage is below the threshold value. If the output voltage is not below the threshold value, the processing moves to step S32, and, if the output voltage is below the threshold value, the processing moves to step S36.

At step S36, the DSP 211 stops the switching operation of the MOSFET 31 by deactivating the drive signal and cuts off the current flowing through the choke coil because the MOSFET 31 is possibly broken due to the current stress.

Alternatively, step S34 may be omitted and, when the drain current exceeds the threshold value, the pulse width in the drive signal may be continuously maintained constant until the output voltage decreases below the threshold value.

Further, at step S34, the DSP 211 may judge whether or not the number of times when the primary-side current exceeds the threshold value in a predetermined period is within an allowable range, and, if the number of times when the primary-side current exceeds the threshold value in the predetermined period is over the allowable range, the DSP 211 may cut off the current flowing through the choke coil.

In this regard, the setting information on the threshold value of the primary-side current, the setting information on the threshold value of the secondary-side voltage, the setting information on the allowable range in the case where the primary-side current exceeds the threshold value, and so on are stored in the data table in the storage unit 212.

In addition, the storage unit 212 stores plural kinds of setting information corresponding to plural kinds of AC input voltages (e.g., 100V, 115V, 120V, and so on) in the data table. The DSP 211 selects one kind of setting information from the plural kinds of setting information according to the input voltage (rectification voltage of the rectifying circuit 11) represented by the output value of the A/D converter 216. Thereby, output characteristics suitable for AC input voltages can be obtained.

Further, the storage unit 212 may store setting information for waiting mode including the drain current to output voltage characteristics and so on when the load device (e.g., an impact printer or the like) is in the waiting mode in addition to the setting information for normal operation mode. In this case, the DSP 211 changes the output characteristic in the waiting mode according to a mode signal representing whether the load device is in the normal operation mode or the waiting mode (see the dashed-dotted line in FIG. 22). Thereby, the power consumption in the waiting mode can be reduced.

Furthermore, the storage unit 212 may store setting information for harsh use environment including the drain current to output voltage characteristics and so on in harsh use environments (e.g., the use location is at the high temperature or the like) in addition to the setting information for the normal use environment. For example, plural kinds of setting information corresponding to plural kinds of temperature ranges are stored in the data table in the storage unit 212. In this case, the DSP 211 changes the output characteristic depending on the temperature range represented by the temperature data outputted from the temperature sensor 120 (see the dashed-two dotted line in FIG. 22). Thereby, the failure of the switching element in harsh use environments can be prevented.

In the case where the load device is an impact printer, the storage unit 212 may store plural kinds of setting information corresponding to plural kinds of print languages (e.g., Japanese, English, and so on) or impact printer models in the data table. In this case, the DSP 211 selects one kind of setting information from the plural kinds of setting information according to a signal representing the print language or the impact printer model. Since the load characteristics vary depending on the print language or the impact printer model, output characteristics suitable for print language or models can be obtained.

In the fifth and sixth embodiments, the chopper type step-up switching power supply and PFC circuit have been explained as examples, however, the present invention is not limited to those, but applicable to various types of switching power supplies using choke coils such as chopper step-down and chopper step-up and step-down types, for example.

INDUSTRIAL APPLICABILITY

The present invention is usable in a switching power supply circuit to be used in electronic equipment.

The invention claimed is:

1. A switching power supply circuit comprising:
   a transformer having a core comprising a magnetic material of amorphous metal, and a primary-side winding and a secondary-side winding wound around the core;
   a switching element series-connected to the primary-side winding of said transformer, for flowing current through the primary-side winding of said transformer according to a pulsive drive signal;
   a primary-side current detection circuit for detecting the current flowing through the primary-side winding of said transformer;
   plural circuit elements for rectifying and smoothing a voltage generated in the secondary-side winding of said transformer to generate an output voltage; and
   a control circuit for generating said drive signal based on at least a detection result of said primary-side current detection circuit, and limiting a period for flowing the current in the primary-side winding of said transformer, wherein:
   said switching element includes an N-channel MOSFET (metal oxide semiconductor field effective transistor) having a drain connected to the primary-side winding of said transformer and a gate to which said drive signal is applied; and
   said primary-side current detection circuit includes a bipolar transistor having a base to which a voltage is applied from the drain of said MOSFET, for performing an emitter-follower operation, and detects the current flowing through the primary-side winding of said transformer by measuring a voltage between the drain and a source of said MOSFET.

2. A switching power supply circuit according to claim 1, further comprising:
   a secondary-side voltage detection circuit for detecting the output voltage generated by said plural circuit elements;
   wherein said control circuit generates said drive signal based on the detection result of said primary-side current detection circuit and a detection result of said secondary-side voltage detection circuit, and sets an upper limit of a pulse width in said drive signal based on the detection result of said secondary-side voltage detection circuit.

3. A switching power supply circuit according to claim 2, wherein said control circuit includes:
   a detection voltage generating circuit for generating a detection voltage in which an upper limit is set based on the detection result of said secondary-side voltage detection circuit;
   a comparator for comparing a detection voltage generated by said primary-side current detection circuit with the detection voltage generated by the detection voltage generating circuit to generate a signal representing a comparison result;

a clock signal generating circuit for generating a clock signal; and a pulse width setting circuit for setting up the pulse width in said drive signal by setting an output signal in synchronization with the clock signal generated by said clock signal generating circuit and resetting the output signal in synchronization with the signal generated by said comparator.

4. A switching power supply circuit according to claim 1, wherein said control circuit reduces a number of pulses in said drive signal to cause said switching element to perform an intermittent operation when judging that the secondary side of said transformer is in a light load condition based on the detection result of said secondary-side voltage detection circuit.

5. A switching power supply circuit according to claim 1, wherein said control circuit sets an upper limit of a period in which plural pulses are continuous in said drive signal in synchronization with a clock signal in a case where a magnitude of the current detected by said primary-side current detection circuit exceeds the rated current.

6. A switching power supply circuit comprising:

a transformer having a core comprising a magnetic material of amorphous metal, and a primary-side winding and a secondary-side winding wound around the core;

a switching element series-connected to the primary-side winding of said transformer, for flowing current through the primary-side winding of said transformer according to a pulsive drive signal;

a primary-side current detection circuit for detecting the current flowing through the primary-side winding of said transformer;

plural circuit elements for rectifying and smoothing a voltage generated in the secondary-side winding of said transformer to generate an output voltage;

a secondary-side voltage detection circuit for detecting the output voltage generated by said plural circuit elements;

a storage unit for storing a data table including setting information on threshold values of at least a primary-side current and a secondary-side voltage; and a digital signal processor for referring to the setting information stored in said storage unit to control a pulse width in the drive signal such that the secondary-side voltage becomes constant when the primary-side current is smaller than the threshold value, maintain the pulse width in the drive signal when the primary-side current exceeds the threshold value, and stop switching operation of said switching element when the secondary-side voltage is lower than the threshold value.

7. A switching power supply circuit according to claim 6, wherein said storage unit further stores setting information on an allowable range in a case where the primary-side current exceeds the threshold value; and said digital signal processor stops the switching operation of said switching element in a case where a number of times when the primary-side current exceeds the threshold value is over the allowable range.

8. A switching power supply circuit according to claim 6, further comprising:

a secondary-side current detection circuit for detecting current flowing through the secondary-side winding of said transformer;

wherein said storage unit further stores setting information on a threshold value of a secondary-side current and an allowable range in a case where the secondary-side current exceeds the threshold value; and said digital signal processor stops the switching operation of said switching element in a case where a time elapsed after the secondary-side current exceeds the threshold value is over the allowable range.

9. A switching power supply circuit according to claim 6, further comprising:

a temperature sensor for detecting a temperature;

wherein said storage unit stores setting information corresponding to plural kinds of temperature ranges; and said digital signal processor controls the switching operation of said switching element according to setting information corresponding to a temperature range detected by said temperature sensor.

10. A switching power supply circuit according to claim 6, wherein said storage unit stores setting information corresponding to a normal operation mode and a waiting mode; and said digital signal processor controls the switching operation of said switching element according to setting information corresponding to a mode signal representing whether a load device is in the normal operation mode or the waiting mode.

11. A switching power supply circuit comprising:

a choke coil having a core comprising a magnetic material of amorphous metal and a winding wound around the core;

a switching element connected to one terminal of said choke coil, for flowing current through said choke coil according to a pulsive drive signal;

a switching current detection circuit for detecting the current of said switching element;

plural circuit elements for rectifying and smoothing a voltage generated in a connection point between said choke coil and said switching element to generate an output voltage;

a voltage detection circuit for detecting the output voltage generated by said plural circuit elements;

a storage unit for storing a data table including setting information on threshold values of at least the current of said switching element and an output voltage; and a digital signal processor for referring to the setting information stored in said storage unit to control a pulse width in the drive signal such that the output voltage becomes constant when the current of said switching element is smaller than the threshold value, maintain the pulse width in the drive signal when the current of said switching element exceeds the threshold value, and stop switching operation of said switching element when the output voltage is lower than the threshold value.

12. A switching power supply circuit according to claim 11, wherein said storage unit further stores setting information on an allowable range in a case where the current of said switching element exceeds the threshold value; and said digital signal processor stops the switching operation of said switching element in a case where a number of times when the current of said switching element exceeds the threshold value is over the allowable range.

13. A switching power supply circuit according to claim 11, further comprising:

an output current detection circuit for detecting the output current of said switching power supply circuit;

wherein said storage unit further stores setting information on a threshold value of the output current and an allowable range in a case where the output current exceeds the threshold value; and said digital signal processor stops the switching operation of said switching element in a case where a time elapsed after the output current exceeds the threshold value is over the allowable range.

14. A switching power supply circuit according to claim 11, further comprising:

an input voltage detection circuit for detecting an input voltage of said choke coil;

wherein said storage unit stores setting information corresponding to plural input voltages; and said digital signal processor controls the switching operation of said switching element according to setting information corresponding to an input voltage detected by said input voltage detection circuit.

* * * * *